US011436480B2

(12) United States Patent
Takeda et al.

(10) Patent No.: US 11,436,480 B2
(45) Date of Patent: Sep. 6, 2022

(54) RESERVOIR AND RESERVOIR COMPUTING SYSTEM

(71) Applicant: INTERNATIONAL BUSINESS MACHINES CORPORATION, Armonk, NY (US)

(72) Inventors: Seiji Takeda, Tokyo (JP); Daiju Nakano, Sagamihara (JP); Toshiyuki Yamane, Yokohama (JP); Jean Benoit Heroux, Kawasaki (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1052 days.

(21) Appl. No.: 15/861,078

(22) Filed: Jan. 3, 2018

(65) Prior Publication Data

US 2019/0205742 A1 Jul. 4, 2019

(51) Int. Cl.
 *G06N 3/06* (2006.01)
 *G06N 3/067* (2006.01)
 *G06N 3/04* (2006.01)

(52) U.S. Cl.
 CPC .......... *G06N 3/0675* (2013.01); *G06N 3/049* (2013.01)

(58) Field of Classification Search
 CPC .......... G06N 3/067; G06N 3/04; G06N 3/063; G06N 3/08; G06N 3/0675; G06N 3/049; G06N 3/0635; G06N 3/0445; G02B 6/4214; G02B 6/43; G02F 1/025; G02F 1/3133; G02F 2201/58; G02F 2203/15
 See application file for complete search history.

(56) References Cited

U.S. PATENT DOCUMENTS

| 9,476,981 | B2  |   | 10/2016 | Yaacobi et al. |
|-----------|-----|---|---------|----------------|
| 9,477,136 | B2  | * | 10/2016 | Bienstman ........... G06N 3/0675 |
| 10,268,232 | B2 | * | 4/2019  | Harris ..................... G02F 3/024 |
| 2010/0226608 | A1 | * | 9/2010  | Chen .................... G02B 6/1225 |
|           |     |   |         | 264/1.25 |
| 2015/0009548 | A1 |   | 1/2015  | Bienstman et al. |

(Continued)

FOREIGN PATENT DOCUMENTS

WO 2017/102972 A1 6/2017

OTHER PUBLICATIONS

Reference Sande et al. "Advances in photonic reservoir computing", Nanophotonics, 2017, pp. 561-576.*

(Continued)

*Primary Examiner* — Li Wu Chang
(74) *Attorney, Agent, or Firm* — Tutunjian & Bitetto, P.C.; Randall Bluestone

(57) ABSTRACT

Provided is a reservoir computing system that is miniaturized and has a reduced learning cost. The reservoir computing system uses a reservoir that includes a first optical output section that outputs a first optical signal; a first optical waveguide that propagates the first optical signal output by the first optical output section; an optical receiving section that receives the first optical signal from the first optical waveguide; a storage section that stores received optical data corresponding to the first optical signal and output by the optical receiving section; and a feedback section that applies, to the first optical signal, feedback corresponding to the received optical data stored in the storage section.

19 Claims, 12 Drawing Sheets

(56) References Cited

U.S. PATENT DOCUMENTS

2017/0351950 A1* 12/2017 Nakano ............... G02B 6/3596
2019/0123231 A1* 4/2019 Furuyama ........... H01L 31/0232

OTHER PUBLICATIONS

Paquot et al. "Optoelectronic Reservoir Computing", Scientific Reports, 2012, pp. 6.*
Larger, L., Complexity in electro-optic delay dynamics: modelling, design and applications Philosophical Transactions of the Royal Society A: Mathematical, Physical and Engineering Sciences, Royal Society, (Oct. 2013) pp. 1-24, vol. 371.
Tanabe, T. et al., "Trapping and delaying photons for one nanosecond in an ultrasmall high-Q photonic-crystal nanocavity" Nature Photonics (Dec. 2006) pp. 49-52, vol. 1.
Larger, L. et al., "High-Speed Photonic Reservoir Computing Using a Time-Delay-Based Architecture: Million Words per Second Classification" Physical Review (Feb. 2017) pp. 011015-1-011015-14, vol. 7.
Appeltant, L. et al., "Information processing using a single dynamical node as complex system" Nature Communications (Sep. 2011) pp. 1-6, vol. 2, No. 468.
Soriano, M.C. et al., "Delay-Based Reservoir Computing: Noise Effects in a Combined Analog and Digital Implementation" IEEE Transactions on Neural Networks and Learning Systems (Feb. 2015) pp. 388-393, vol. 26, No. 2.

* cited by examiner

RESERVOIR AND RESERVOIR COMPUTING SYSTEM

BACKGROUND

Technical Field

The present invention relates to a reservoir and a reservoir computing system.

Related Art

A reservoir computing system that uses a recurrent network structure referred to as a reservoir is known as a learning method for handling time-series data, such as for voice recognition and securities predictions.

Such a reservoir computing system preferably uses the reservoir to propagate a signal component therein in a complex manner, in order to learn a complex input/output characteristic. A laser apparatus can realize a complex nonlinear input/output characteristic by using external feedback light obtained by lengthening the external propagation distance of the light. However, when the external propagation distance of the external feedback light of the laser apparatus is lengthened, the size of the laser apparatus is increased, and therefore it is difficult to realize a small-scale reservoir computing system.

SUMMARY

According to a first aspect of the present invention, provided is a reservoir for an optical reservoir computing system, comprising a first optical output section that outputs a first optical signal; a first optical waveguide that propagates the first optical signal output by the first optical output section; an optical receiving section that receives the first optical signal from the first optical waveguide; a storage section that stores received optical data corresponding to the first optical signal and output by the optical receiving section; and a feedback section that applies, to the first optical signal, feedback corresponding to the received optical data stored in the storage section.

According to a second aspect of the present invention, provided is a reservoir computing system comprising the reservoir according to the first aspect; an input node that supplies an input signal corresponding to input data to the reservoir; and an output node that outputs output data corresponding to an output signal output by the reservoir in response to the input data.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
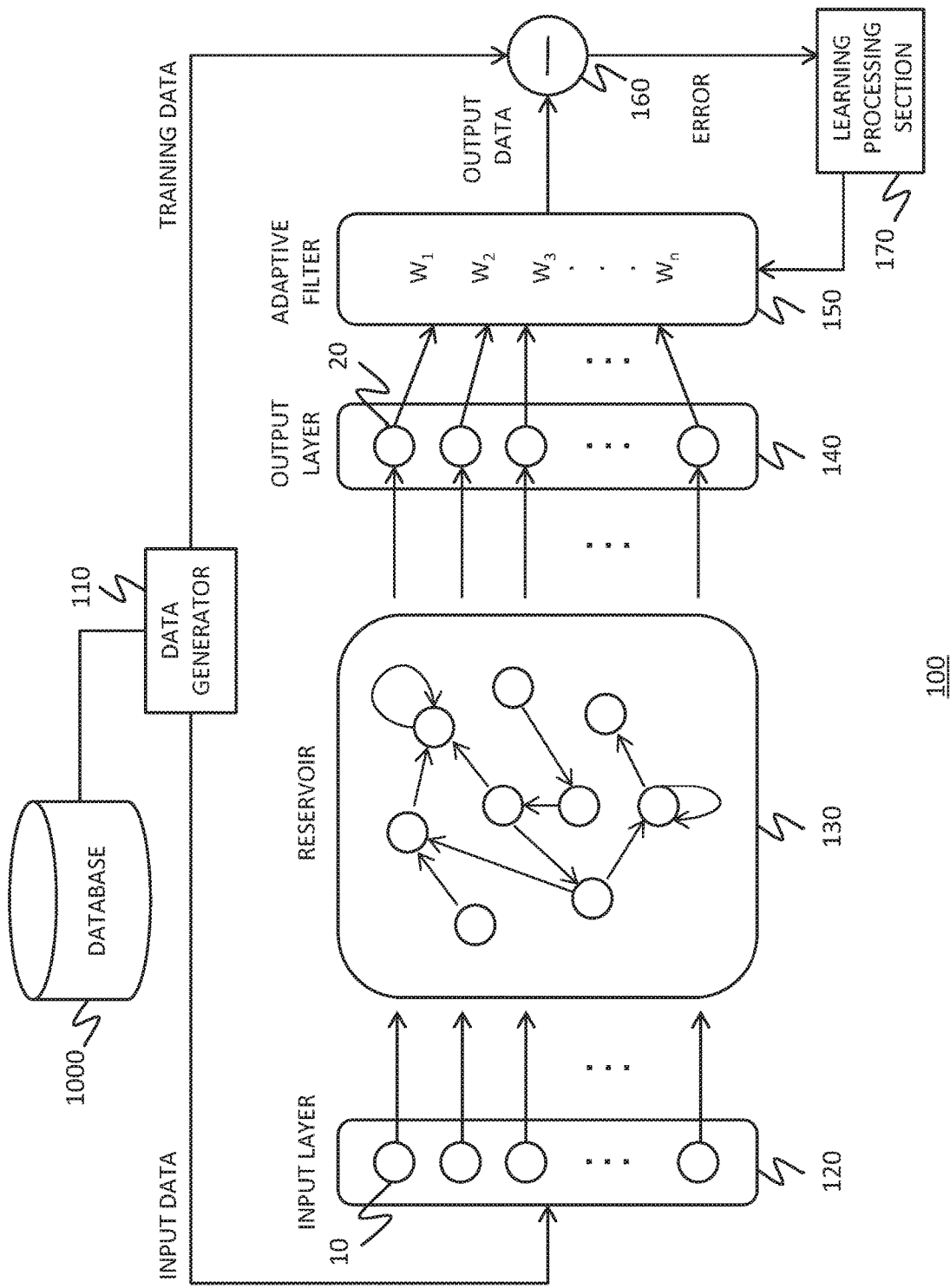
FIG. 1 shows an exemplary configuration of a reservoir computing system 100.

FIG. 1 shows an exemplary configuration of a reservoir computing system 100. The reservoir computing system 100 may be an apparatus that performs learning based on input data, output data, and training data. Furthermore, the reservoir computing system 100 may be operable to perform testing and make predictions for output data corresponding to the input data, based on the learning results. The reservoir computing system 100 adjusts weights in the system, in a manner to reduce the difference between output data that is output in response to the input data and training data corresponding to the input data. The reservoir computing system 100 includes a data generator 110, an input layer 120, a reservoir 130, an output layer 140, an adaptive filter 150, a comparing section 160, and a learning processing section 170.

The data generator 110 may be operable to generate the input data and supply the reservoir computing system 100 with the input data. If the reservoir computing system 100 is performing learning, the data generator 110 may generate training input data and training data corresponding to this input data, and supply the reservoir computing system 100 with this input data and training data. Furthermore, when the reservoir computing system 100 performs a test, makes a prediction, or the like based on learning results, the data generator 110 may generate input data for testing and supply the reservoir computing system 100 with this input data.

The data generator 110 is connected to an external database 1000 or the like, and may be operable to acquire the input data and the training data. Instead, the data generator 110 may generate the input data and the training data, using a predetermined algorithm or the like. The input data is a time-series data sequence in which a plurality of pieces of data are arranged according to the time axis, such as audio data, video data, or the like, for example. Furthermore, the training data may be expected output data that is expected for the input data.

The data generator 110 may read and acquire input data stored in a predetermined format. Furthermore, the data generator 110 may be connected to a network or the like and acquire input data and the like via this network. Instead of or in addition to this, the data generator 110 may be connected to an apparatus manipulated by a user, an apparatus (sensor) that detects and outputs time-series data, or the like, and acquire the time-series input data. The data generator 110 may store the acquired input data and the like in a storage apparatus or the like inside the reservoir computing system 100.

The input layer 120 may be operable to input the input data from the data generator 110. The input layer 120 may include one or more input nodes 10. The input data may be input to one or more corresponding input nodes 10. Each input node 10 may be operable to supply the reservoir 130 with an input signal corresponding to the input data. Each input node 10 may be operable to supply the input signal to one or more corresponding nodes of the reservoir 130. A weight may be set between each input node 10 and one or more corresponding nodes of the reservoir 130. Each input node 10 may supply an input signal that has been multiplied by the weight set for the input data to the one or more corresponding nodes.

The reservoir 130 may be operable to output an inherent output signal in response to the input signal. The reservoir 130 may have a network including a plurality of nodes. The reservoir 130 may have a recurrent type network structure. Each of the plurality of nodes of the reservoir 130 may be a nonlinear node that issues a nonlinear response to the input signal. The plurality of nodes of the reservoir 130 may be virtual nodes. In the network including the reservoir 130, each of the plurality of nodes may supply other corresponding nodes with a response signal corresponding to the input signal. In this case, each of the plurality of nodes may supply the other corresponding nodes with a weighted response signal.

The output layer 140 may be operable to output the response signal output by each node of the reservoir 130. The output layer 140 may include a plurality of output nodes 20. The output layer 140 preferably includes a number of output nodes 20 that is substantially the same as the number of nodes of the reservoir 130. For example, the plurality of output nodes 20 correspond one-to-one with the plurality of nodes of the reservoir 130. Each output node 20 may be operable to output an output value corresponding to the output signal output by the reservoir 130 in response to the input data. Each output node 20 may be operable to output to the adaptive filter 150 an output value of a corresponding node of the reservoir 130.

The adaptive filter 150 may be operable to output the output data based on the output value output from each output node 20. For example, the adaptive filter 150 applies weights corresponding respectively to the output value output by each output node 20, and outputs the result obtained by performing a predetermined calculation as the output data. As an example, the adaptive filter 150 outputs, as the output data, the sum of each of the weighted values of the output values of the output nodes 20. If the number of output nodes 20 is n, for example, the adaptive filter 150 outputs, as the output data, the sum $\Sigma w_n V_n$ of the values obtained by multiplying the n output values $V_n$ by the corresponding n weights ($w_1, w_2, \ldots, w_n$). The adaptive filter 150 may be operable to supply the comparing section 160 with the output data.

The comparing section 160 may be operable to compare the expected output data output by the data generator 110 to the output data output by the adaptive filter 150. For example, the comparing section 160 outputs the difference between the expected output data and the output data as an error. The comparing section 160 may supply the learning processing section 170 with this error as the comparison result.

Furthermore, the comparing section 160 may be operable to perform a comparison operation if the reservoir computing system 100 is learning. The comparing section 160 may be operable to, if the reservoir computing system 100 is performing a test or making a prediction using learning results, output the output data of the adaptive filter 150 to the outside as-is. In this case, the comparing section 160 may be operable to output the output data to an external output apparatus such as a display, a storage apparatus, and an external apparatus such as the database 1000.

The learning processing section 170 may be operable to set the plurality of weights of the adaptive filter 150 according to the comparison results of the comparing section 160. The learning processing section 170 may be operable to set the plurality of weights such that the reservoir computing system 100 outputs the output data that is expected in response to the input data. The learning processing section 170 may be operable to update the plurality of weights in a manner to further reduce the error between the output data output by the adaptive filter 150 in response to the training input data being supplied to the input node 10 and the expected output data that is expected for the training input data. The learning processing section 170 may be operable to operate if the reservoir computing system 100 is learning.

The reservoir computing system 100 described above may be a system capable of learning by updating the weights of the adaptive filter 150. Specifically, the reservoir computing system 100 may be operable to perform learning by updating the weights of the adaptive filter 150 while the weights between the input layer 120 and the reservoir 130 and the weights within the reservoir 130 are fixed at randomly determined initial values, for example.

Furthermore, by fixing the weights of the adaptive filter 150 at the learned weights and inputting input data for testing, the reservoir computing system 100 can output test results or prediction results for the input data for testing. Such a reservoir computing system 100 can simulate a learning operation and a testing operation by performing matrix calculations. Furthermore, if the reservoir computing system 100 is a physical device that outputs a nonlinear output signal in response to an input signal, the reservoir computing system 100 can be used as a reservoir 130, and is therefore expected to be a system with easy hardware installation.

However, if such a reservoir computing system 100 is actually implemented as physical systems, the output signals must be extracted from the plurality of nodes of the reservoir 130. However, it is difficult to extract the output signals from all of the nodes of the internal network of the reservoir 130. Furthermore, if the reservoir 130 uses virtual nodes, it is difficult to extract the output signals from the virtual nodes. Yet further, if a failure occurs in the attempt to extract the output signals from a portion of the nodes of the reservoir 130, even if the reservoir 130 operates correctly it is impossible to accurately perform the learning, testing, and the like if this failure is not resolved.

Therefore, the reservoir computing system according to the present embodiment performs the learning, predicting, and the like based on the output signals of a portion of the nodes of the reservoir 130. The following describes such a reservoir computing system.

Figure 2:
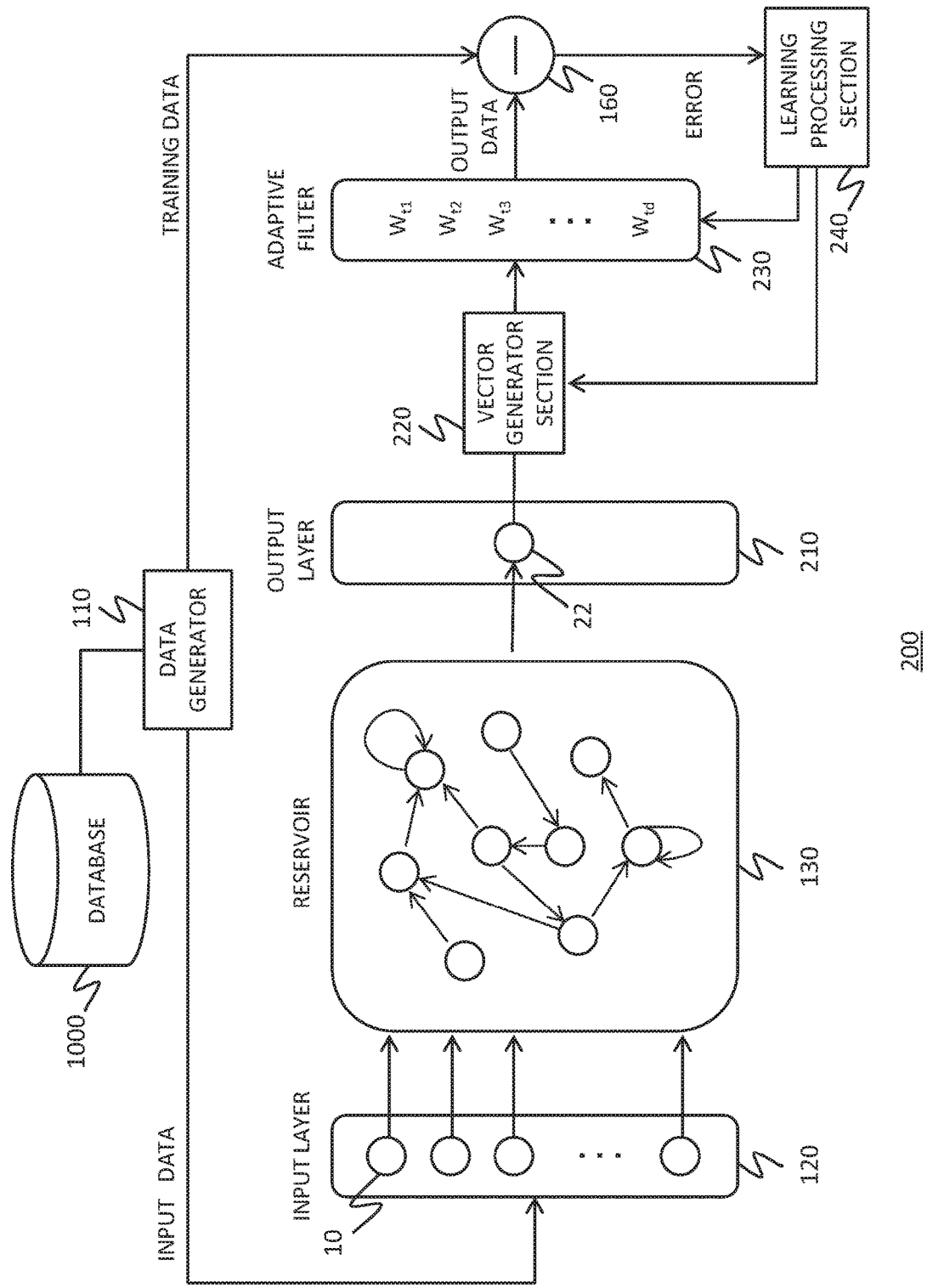
FIG. 2 shows an exemplary configuration of a reservoir computing system 200 according to the present embodiment.

FIG. 2 shows an exemplary configuration of a reservoir computing system 200 according to the present embodiment. In the reservoir computing system 200 according to the present embodiment, components having substantially the same operation as components of the reservoir computing system 100 shown in FIG. 1 are given the same reference numerals and descriptions thereof are omitted. The reservoir computing system 200 according to the present embodiment includes the data generator 110, the input layer 120, the reservoir 130, an output layer 210, a vector generator section 220, an adaptive filter 230, and a learning processing section 240.

The output layer 210 may be operable to output response signals that are output by a portion of the plurality of nodes of the reservoir 130. The output layer 210 may include one or more output nodes 22. The output layer 210 may include a number of output nodes 22 that is less than the number of nodes of the reservoir 130. In other words, only some of the nodes among the plurality of nodes of the reservoir 130 are connected to output nodes 22.

FIG. 2 shows an example in which the output layer 210 includes one output node 22, and only one node among the plurality of nodes of the reservoir 130 is connected to the output node 22. The output node 22 may be operable to output an output value corresponding to an output signal output by the reservoir 130 in response to the input data. The output node 22 may be operable to output the output value of the corresponding node of the reservoir 130 to the vector generator section 220.

The vector generator section 220 may be operable to generate a multidimensional vector based on the output value output from the one output node 22 and a plurality of timings. The vector generator section 220 may be operable to generate a d-dimensional delay coordinate vector based on one-dimensional time-series data and d timings. In this case, the vector generator section 220 may generate d data sequences.

Here, if the time-series data is a continuous value, the time difference between temporally adjacent timings among the plurality of timings is an interval T. Specifically, if the time-series data is a continuous value, the vector generator section 220 may generate the d-dimensional delay coordinate vector with d timings at intervals T. If the time-series data is a digital value, the vector generator section 220 may generate the d-dimensional delay coordinate vector with d timings corresponding to the clock period.

If n is the degree of freedom of the reservoir 130, i.e. the number of nodes in the reservoir 130, the vector generator section 220 may generate a d-dimensional delay coordinate vector in which d is greater than n. In this case, the vector generator section 220 preferable generates a d-dimensional delay coordinate vector in which d is greater than 2n. If the output layer 210 includes a plurality of output nodes 22, the vector generator section 220 may generate a delay coordinate vector for each output node 22. The vector generator section 220 supplies the adaptive filter 230 with the generated delay coordinate vectors.

The adaptive filter 230 may be operable to output data based on results obtained by weighting a plurality of output values output from the output node 22 at a plurality of timings with a plurality of weights. The adaptive filter 230 may use a plurality of weights corresponding to the dimensions d of the delay coordinate vector. For example, for each of the d data sequences, the adaptive filter 230 may weight this data sequence using d weights.

The adaptive filter 230 may generate and output the output data from the weighted d-dimensional delay coordinate vector. The adaptive filter 230 may be operable to supply the comparing section 160 with the output data. If the reservoir computing system 200 is learning, the comparing section 160 may supply the learning processing section 240 with the difference between the expected output data and the output data as the error. Furthermore, the comparing section 160 may be operable to, if the reservoir computing system 100 is performing a test or making a prediction using the learning results, output the output data of the adaptive filter 150 to the outside as-is.

The learning processing section 240 may be operable to set the plurality of weights of the adaptive filter 150 according to the comparison results of the comparing section 160. The learning processing section 240 may be operable to set the plurality of weights such that the output data expected for the input data is output by the reservoir computing system 200. The learning processing section 240 may be operable to update the plurality of weights in a manner to reduce the error between the output data output by the adaptive filter 230 in response to the training input data being supplied to the input nodes 10 and the expected output data that is expected for the training input data. The learning processing section 240 may be operable to operate if the reservoir computing system 100 is performing learning.

Furthermore, the learning processing section 240 may be operable to adjust at least a portion of the parameters for generation of the delay coordinate vector by the adaptive filter 230. The learning processing section 240 may be operable to, if the time-series data is a continuous value, adjust one or both of the number of dimensions d and the interval T. Furthermore, the learning processing section 240 may be operable to, if the time-series data is a digital value, adjust the number of dimensions d.

In the manner described above, the reservoir computing system 200 may be a system capable of learning based on the output values and the expected output data of a portion of the nodes among the plurality of nodes of the reservoir 130. The following describes the operation of such a reservoir computing system 200.

Figure 3:
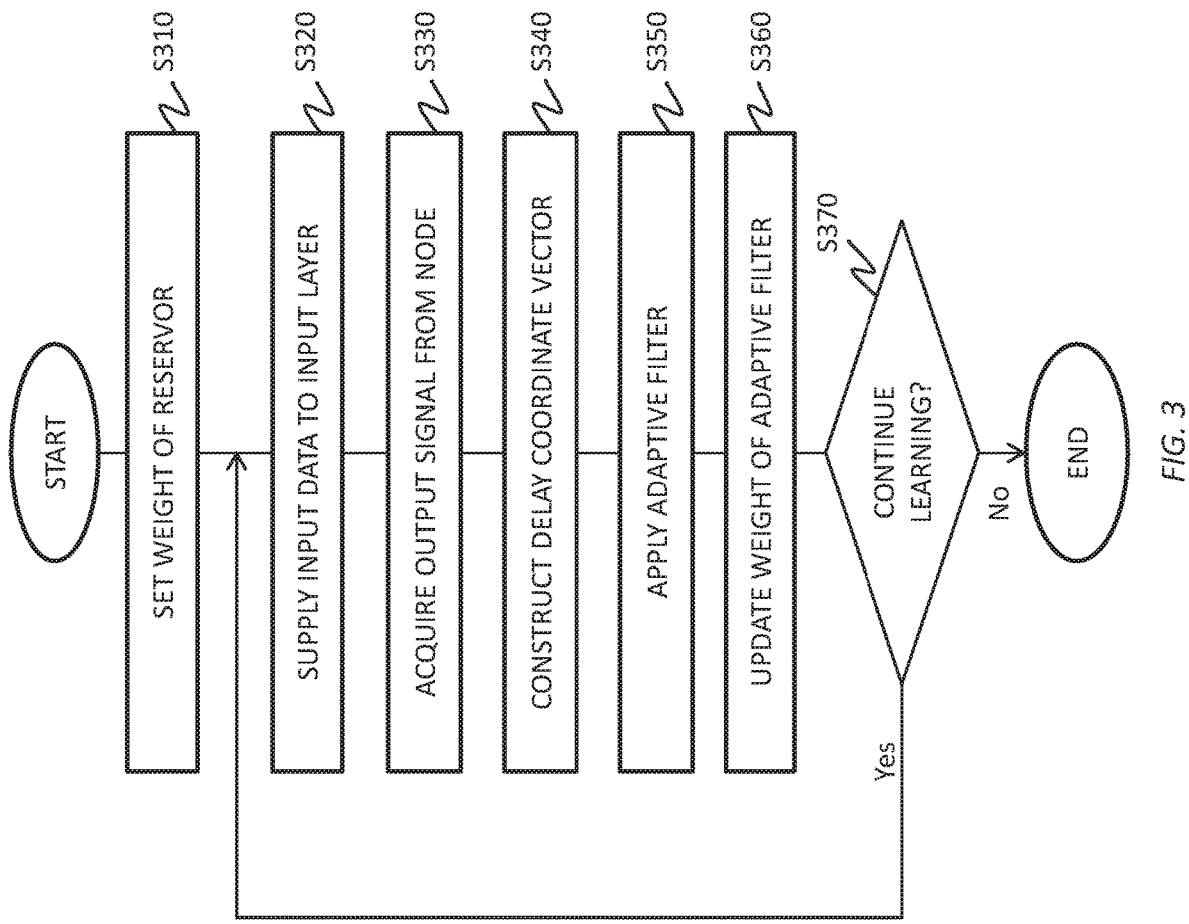
FIG. 3 shows an exemplary operational flow of the reservoir computing system 200 according to the present embodiment.

FIG. 3 shows an exemplary operational flow of the reservoir computing system 200 according to the present embodiment. In the present embodiment, the reservoir computing system 200 may be operable to perform learning by performing the processes from S310 to S370.

First, at S310, the weights of the reservoir 130 may be initially set. The reservoir computing system 200 may perform initial setting of the weights between the input layer 120 and the reservoir 130 and of the weights inside the reservoir 130. The weights between the input layer 120 and the reservoir 130 and of the weights inside the reservoir 130 may be determined using random numbers. The weights between the input layer 120 and the reservoir 130 and of the weights inside the reservoir 130 do not need to change according to learning performed after being determined once.

Next, at S320, the input data may be supplied to the input layer 120. The data generator 110 may supply the input layer 120 with the training input data generated by the data generator 110. Here, the data generator 110 may generate the expected output data corresponding to the training input data supplied to the input layer 120 and supply this expected output data to the comparing section 160.

Next, at S330, the output layer 210 may acquire the output signals output by a portion of the nodes of the reservoir 130. In the present embodiment, an example is described in which the output layer 210 includes one output node 22 and acquires the output signal of one node among the plurality of nodes of the reservoir 130.

Next, at S340 the vector generator section 220 may generate the d-dimensional delay coordinate vector. Here, if the time-series data is a continuous value, the vector generator section 220 may generate the delay coordinate vector using d timings and the parameter of the interval T between the timings, as shown in the following expression. Here, x(t) is one-dimensional time-series data output from the one output node 22.

$$x(t), t \in \mathbb{R} \rightarrow \{x(t), x(t-T), \ldots, x(t-(d-1)T)\} \in \mathbb{R}^d \quad \text{Expression 1:}$$

Furthermore, if the time-series data is a digital value, the vector generator section 220 may generate the delay coordinate vector using d timings, as shown in the following expression.

$$x(n), n \in \mathbb{N} \rightarrow \{x(n), x(n-1), \ldots, x(n-(d-1)T)\} \in \mathbb{R}^d \quad \text{Expression 2:}$$

Next, at S350, the adaptive filter 230 may generate and output the output data by applying the weights to the delay coordinate vector. For example, the adaptive filter 230 may multiply the d data sequences respectively by d corresponding weights ($w_{t1}, w_{t2}, \ldots, w_{td}$). Furthermore, the adaptive filter 230 may output, as the output data, the weighted delay coordinate vector configured as one-dimensional time-series data. Specifically, the adaptive filter 230 may calculate the dot product of the delay coordinate vector and a weight vector ($w_{t1}, w_{t2}, \ldots, w_{td}$) having d weights as elements.

Next, at S360, the learning processing section 240 may update the weights of the adaptive filter 230. The learning processing section 240 may update the d weights in a manner to reduce the error between the expected output data and the output data. The learning processing section 240 may update the weights of the adaptive filter 230 such that the output data becomes closer to the expected output data, using the least squares method. In this case, the learning processing section 240 may update the d weights using a linear filter.

Furthermore, the learning processing section 240 may update the weights of the adaptive filter 230 in a manner to minimize the square error. In this case, the learning processing section 240 may update the d weights using a Wiener filter.

If the learning is to continue (S370: Yes), the reservoir computing system 200 may return to step S320 and perform the next learning using the next training input data and expected output data. The reservoir computing system 200 may repeat the update of the weights of the adaptive filter 230 a predetermined number of times to determine these weights. If the difference in the value before the weight update and after the weight update is greater than or equal to a predetermined threshold value even after the update of the weights of the adaptive filter 230 has been performed the predetermined number of times, the learning processing section 240 may stop the learning and notify the user that the weights do not converge.

If the learning is to end (S370: No), the reservoir computing system 200 may determine the weights of the adaptive filter 230 to be the most recently updated weights. The reservoir computing system 200 may store the determined weights in an internal storage section and/or an external database 1000 or the like. In the manner described above, the reservoir computing system 200 may complete the learning operation.

By applying the determined weights to the adaptive filter 230 and inputting testing input data, the reservoir computing system 200 can output test results or prediction results for this testing input data. The following describes the input data and the delay coordinate vector of such a reservoir computing system 200.

Figure 4:
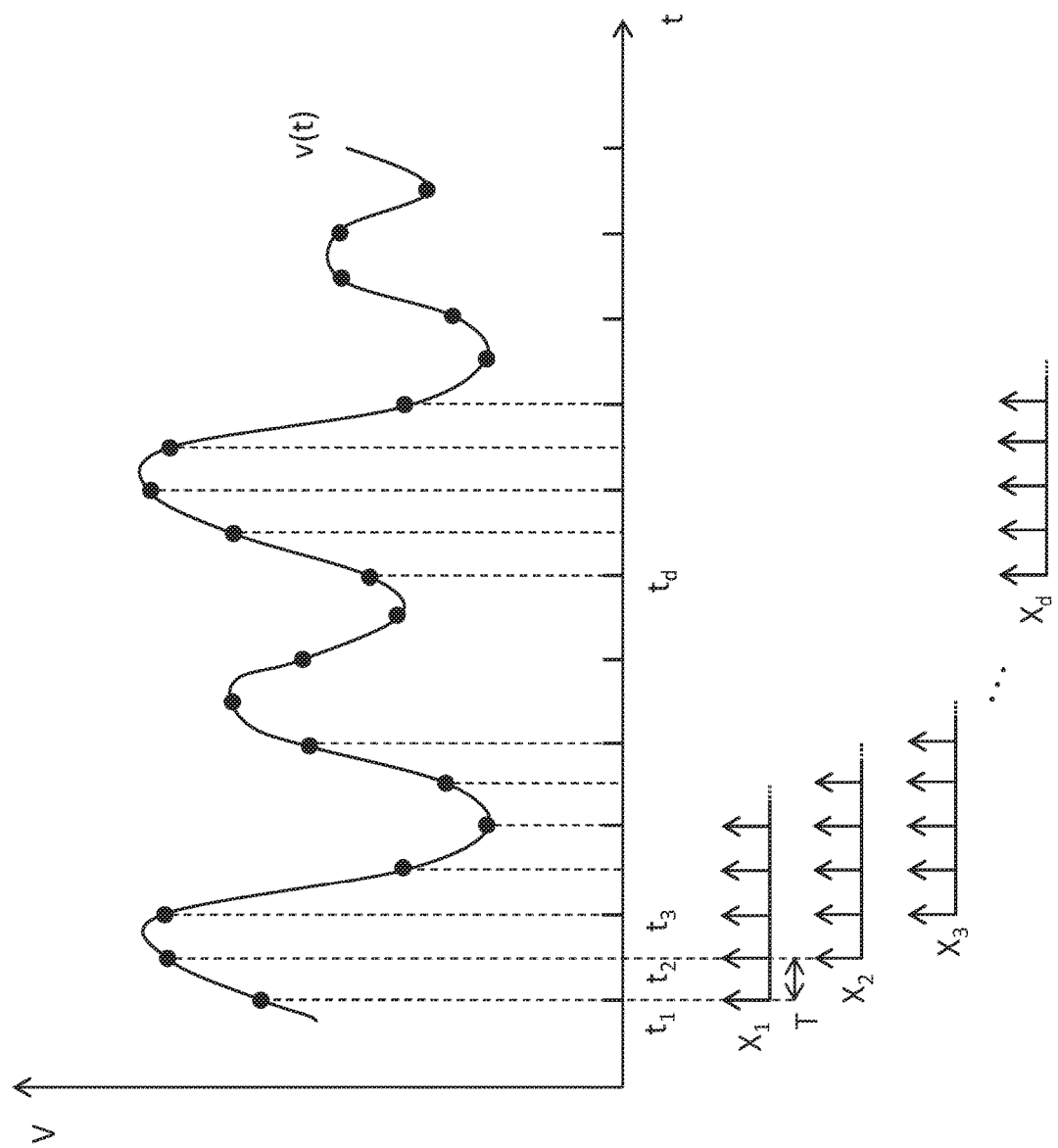
FIG. 4 shows an exemplary delay coordinate vector generated by the vector generator section 220 according to the present embodiment.

FIG. 4 shows an exemplary delay coordinate vector generated by the vector generator section 220 according to the present embodiment. FIG. 4 shows an example in a case where the input data is a continuous value. In FIG. 4, the horizontal axis indicates time t and the vertical axis indicates the signal strength V. The curve v(t) shows an example of the input data.

The vector generator section 220 may set a data sequence $X_1$ having a signal strength $v(t_m)$ at the time $t_m$ at every interval T from the signal strength $v(t_1)$ at the timing $t_1$ as the first vector element of the delay coordinate vector. Furthermore, the vector generator section 220 may set a data sequence $X_2$ having a signal strength $v(t_m)$ at the time $t_m$ at every interval T from the signal strength $v(t_2)$ at the timing $t_2$ as the second vector element of the delay coordinate vector. In the same manner, the vector generator section 220 may extract data sequences up to the data sequence $X_d$ of the d vector elements and set these data sequences from the data sequence $X_1$ to the data sequence $X_d$ as the delay coordinate vector.

In this case, the adaptive filter 230 may calculate the data sequence $w_{t1}X_1$ by multiplying each piece of data in the data sequence $X_1$ by the weight $w_{t1}$. In the same manner, the adaptive filter 230 may calculate the data sequences $w_{t1}X_1$, $w_{t2}X_2, \ldots, w_{t3}X_3$ by multiplying each piece of data in each of the data sequences from the data sequence $X_2$ to the data sequence $X_d$ by the corresponding weights from $w_{t2}$ to $w_{td}$.

The adaptive filter 230 may then calculate the data sequence $w_{t1}X_1$ at the timing $t_1$ and calculate the data sequence $w_{t2}X_2$ at the timing $t_2$. Here, among the pieces of data of the data sequence $w_{t1}X_1$ and the data sequence $w_{t2}X_2$, pieces of data with the same timings may be added together. In the same manner, the adaptive filter 230 may calculate each data sequence from the data sequence $w_{t3}X_3$ to the data sequence $w_{td}X_d$ corresponding to the timings from the timing $t_3$ to the timing $t_d$, and output the generated time-series data as the output data.

FIG. 4 shows an example in which the input data is a continuous value, but instead the input data may be a digital signal expressed by a signal strength $v(t_1+(m-1)T_c)$ with a constant clock period $T_c$. In this case, in the same manner as in the example where the input data is a continuous value, the vector generator section 220 may set the data sequence $X_1$ from the signal strength $v(t_1)$ at the timing $t_1$ as the first vector element of the delay coordinate vector. Furthermore, the vector generator section 220 may set the data sequence $X_2$ from the timing $t_2=t_1+T_c$ as the second vector element of the delay coordinate vector.

In the same manner, the vector generator section 220 may extract the data sequences up to the data sequence $X_d$ of the d-th vector element and set the data sequences from the data sequence $X_1$ to the data sequence $X_d$ as the delay coordinate vector. In this case, the interval T may be substantially equal to the clock period $T_c$. In this way, regardless of whether the input data is a continuous value or a digital value, the adaptive filter 230 can output the output data using the same operation.

An "Embedding Theorem" according to Takens is known as a technique for investigating a dynamics model, if the structure of the dynamics model is unknown, by performing a reconfiguration using the time delay coordinates corresponding to the time-series data that has actually been measured. The reservoir computing system 200 uses such an embedding theorem, and therefore can perform the learning and testing operations corresponding to the state of the reservoir 130 without using the output values of all of the nodes of the reservoir 130.

Figure 5:
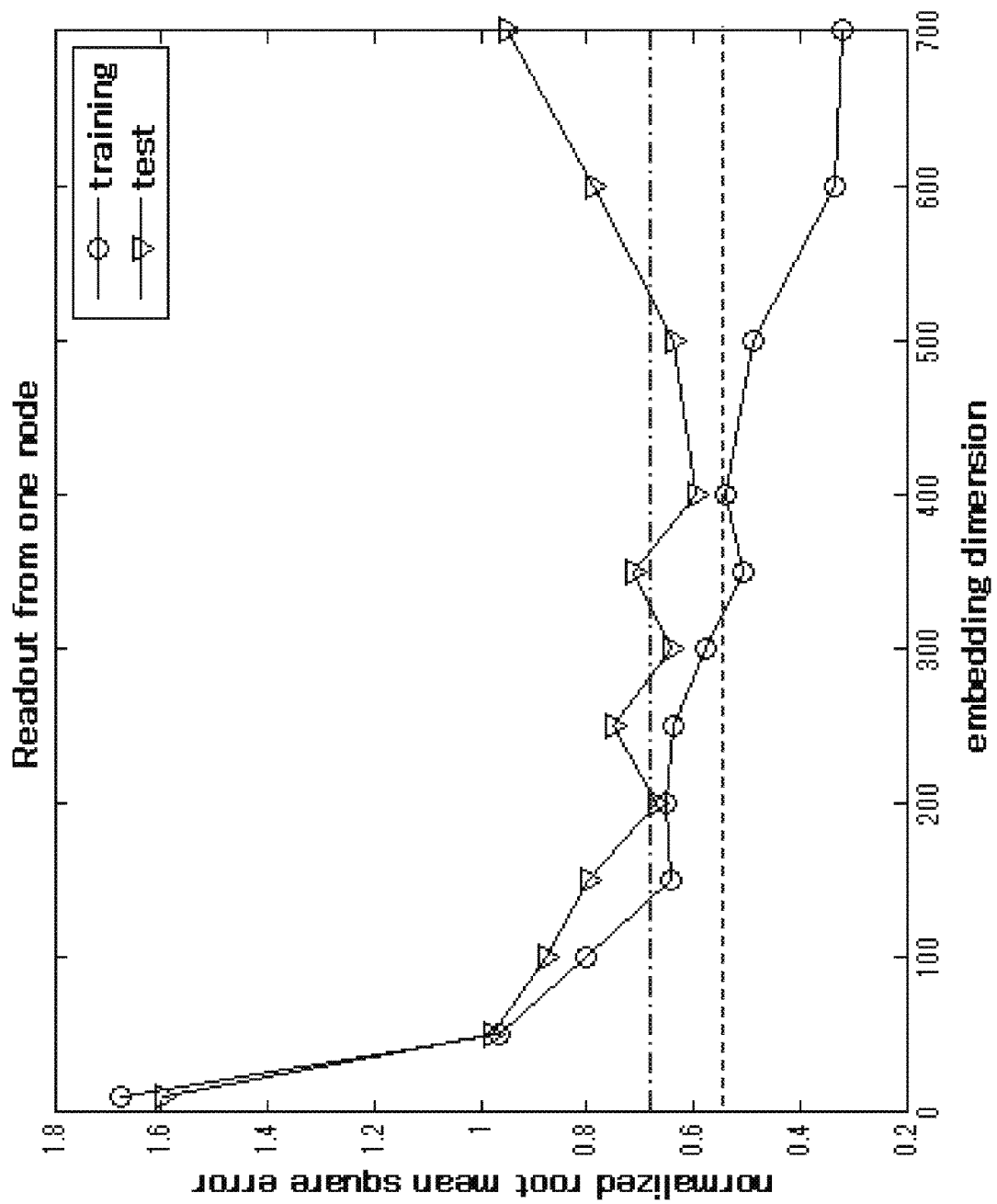
FIG. 5 shows exemplary learning results of the reservoir computing system 200 according to the present embodiment described above.

FIG. 5 shows exemplary learning results of the reservoir computing system 200 according to the present embodiment described above. FIG. 5 shows the steps by which the reservoir computing system 200 further adjusts the parameter d used by the vector generator section 220. In FIG. 5, the horizontal axis indicates the dimensions d of the delay coordinate vector. In FIG. 5, the vertical axis indicates the evaluation value of the error. The evaluation value of the error is the normalized root mean square error, and is abbreviated as NRMSE. The NRMSE is expressed as shown in the following expression.

Expression 3:

$$NRMSE = \sqrt{\frac{\langle (y-y')^2 \rangle}{\langle (y-\langle y \rangle)^2 \rangle}}$$

In Expression 3, the expected output data, which is the training data, is y, and the output data is y'. Specifically, the denominator in Expression 3 indicates the standard deviation of the expected output data y, and the numerator indicates the expected value of the square of the error y-y'. The evaluation value NRMSE indicates that the learning is effective if the value is smaller than 1 and indicates that the effect of the learning is higher when this value is closer to 0. Specifically, the evaluation value NRMSE is an evaluation value that approaches 0 as the error y-y' becomes smaller.

FIG. 5 shows an example of results obtained by the reservoir computing system 200 learning an Echo Stat Network as shown by the following expression.

Expression 4:

$$x(n+1) = \tanh(W_{res}x(n) + W_{in}u(n))$$

$$y'(n) = W\_out\, x(n)$$

$$y(n) =$$

$$0.3y(n-1) + 0.05y(n-1)\sum_{i=1}^{10} y(n-i) + 1.5u(n-1)u(n-10) + 0.1$$

Here, u(n) represents the input data input to the input node 10, x(n) represents reservoir state vector corresponding to the input data, and y' (n) represents the output data. Furthermore, $W_{in}$ represents the coupled matrix between the input node 10 and the reservoir 130, $W_{res}$ represents the coupled matrix inside the reservoir 130, and $W_{out}$ represents the coupled matrix between the reservoir 130 and the output node 22. Yet further, $W_{res}$ may be a sparse matrix with a connectivity of approximately 0.3, for example.

In addition, y(n) represents the expected output data. The expected output data y(n) in Expression 4 is a model that is known as a NARMA (10) model used as a benchmark in reservoir computing. Here, NARMA is an abbreviation for Nonlinear Auto Recursive Moving Average.

FIG. 5 shows an example of results obtained by the reservoir computing system 200 learning the NARMA (10) model for every dimension d of the delay coordinate vector using the reservoir 130 including 100 nodes therein. The circle marks plotted in FIG. 5 indicate learning results of the reservoir computing system 200. Furthermore, the triangular marks plotted in FIG. 5 indicate results of a test using the learning results.

FIG. 5 uses a dotted line to show the learning results of the reservoir computing system 100 using the output data from all of the output nodes 20, as described in FIG. 1, for comparison. The single-dash line indicates the test results obtained using the learning results of the reservoir computing system 100. Since the reservoir computing system 100 using all of the output nodes 20 does not use a delay coordinate vector, the learning results and test results are substantially constant values that are unrelated to the value d of the horizontal axis.

From FIG. 5, it is understood that if the number of dimensions is less than or equal to 100, which is the number of nodes in the reservoir 130, the performance enters "under-fitting" territory where the reservoir computing system 200 does not have an effect despite performing the learning. It is also understood that if the number of dimensions d of the delay coordinate vector exceeds approximately twice the number of nodes (100) of the reservoir 130, the reservoir computing system 200 can perform learning with high accuracy. Yet further, it is understood that if the number of dimensions d of the delay coordinate vector exceeds approximately 500, the reservoir computing system 200 enters into "over-fitting" territory.

Accordingly, the learning processing section 240 may be operable to adjust the number of timings among the plurality of timings, i.e. the number of dimensions d, in a manner to further decrease the error. The learning processing section 240 may be operable to compare the learning results corresponding to the plurality of dimensions d and set a suitable number of dimensions d, as shown in the example of FIG. 5. Furthermore, the learning processing section 240 may be operable to also adjust the interval T between the plurality of timings. The learning processing section 240 may be operable to compare the learning results for a plurality of intervals T and set a suitable interval T, as shown in the example of FIG. 5. The learning processing section 240 may be operable to adjust at least one of the number of dimensions d and the interval T.

The learning processing section 240 may be operable to adjust at least one of the number of timings among the plurality of timings and the interval T between the plurality of timings, using cross-validation. Specifically, the learning processing section 240 may perform learning using a portion of a plurality of groups of input data and expected output data corresponding to this input data. The learning processing section 240 may perform testing of the remaining groups using the learning results, and calculate the evaluation value NRMSE according to the error between the output data and the expected output data. FIG. 5 shows an example of evaluation results obtained by the learning processing section 240 using such cross-validation.

In the manner described above, the reservoir computing system 200 according to the present embodiment can perform learning by using the output of a portion of the plurality of nodes of the reservoir 130 to generate a delay coordinate vector from output values at a plurality of timings. If many types of input/output data are to be learned accurately, there is an idea to increase the number of nodes in the reservoir 130 and create a more complex system. In this case, it becomes even more difficult to reliably connect to all of the output nodes and extract the output data.

However, the reservoir computing system 200 according to the present embodiment can restrict the increase in the number of connections to output nodes and perform learning by increasing the number of dimensions d, and can therefore easily adapt to a complex reservoir 130. Furthermore, since learning is possible with just a small amount of an increase in the number of dimensions d of the reservoir computing system 200, e.g. from the total number of nodes to twice the total number of nodes, learning can be performed without significantly increasing the amount of calculations.

Figure 6:
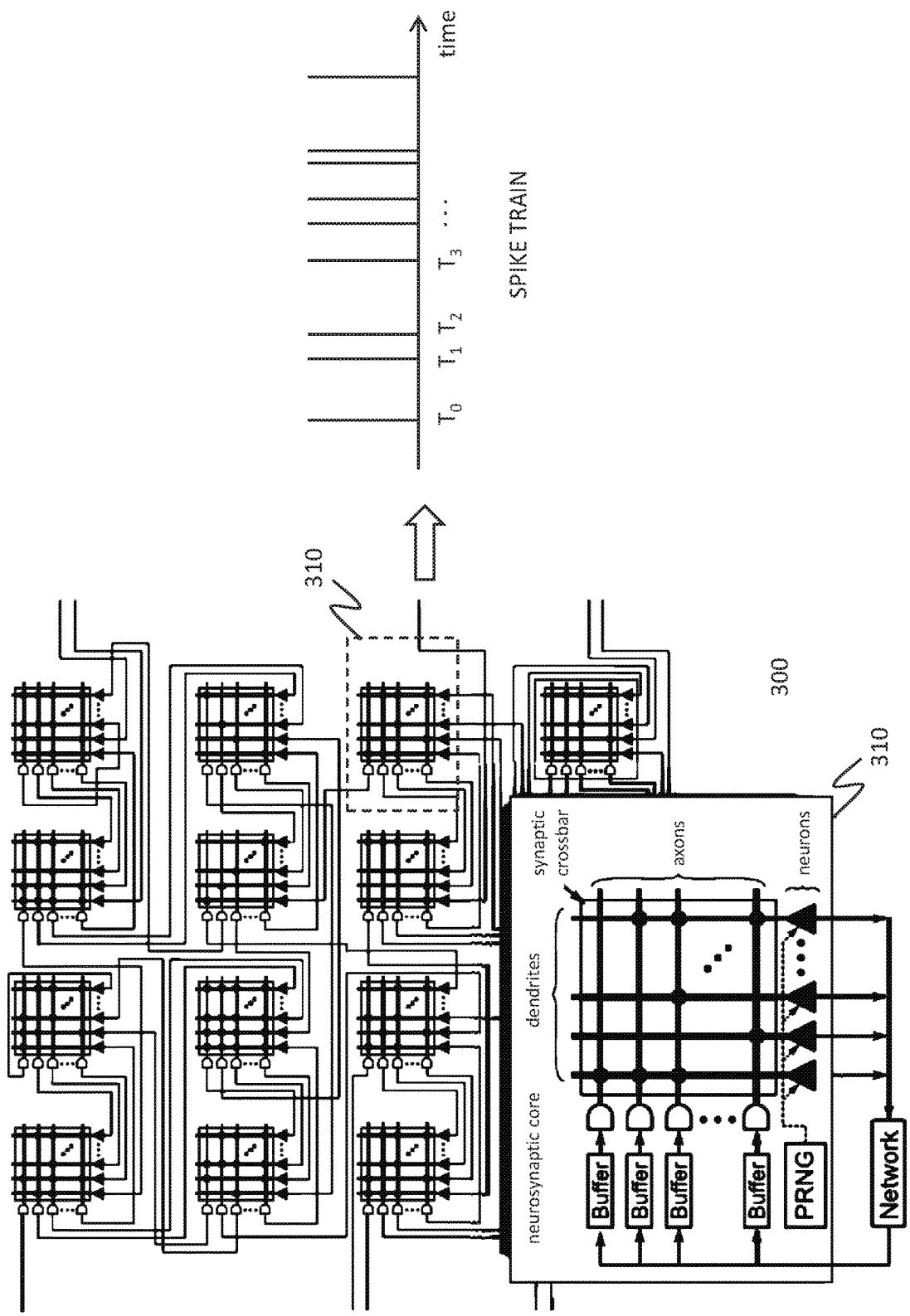
FIG. 6 shows an example of a spike neuron model used by the reservoir computing system 200 according to the present embodiment.

The reservoir computing system 200 according to the present embodiment described above may use a spike neural network or the like as the reservoir 130. FIG. 6 shows an example of a spike neuron model used by the reservoir computing system 200 according to the present embodiment. FIG. 6 shows neuromorphic hardware 300 based on the spike neuron model.

The neuromorphic hardware 300 may include a plurality of neuron devices 310. Each neuron device 310 may be electrically connected to an external signal generating section and one or more other neuron devices 310, and receive an input signal that changes over time. Each neuron device 310 may output a spiked output signal to the one or more other neuron devices 310, according to the input pattern of a plurality of input signals. Such neuromorphic hardware 300 may be configured as a liquid state machine.

The reservoir computing system 200 according to the present embodiment may use such neuromorphic hardware 300 as the reservoir 130. Specifically, the plurality of input nodes 10 in the input layer 120 are each connected to a corresponding neuron device 310. Furthermore, one or more output nodes 22 are connected to a portion of the neuron devices 310 among the plurality of neuron devices 310. For example, one output node 22 receives a spiking train from one neuron device 310, as shown in FIG. 6.

Here, the one output node 22 may be operable to output, as the output value, a value $(T_1-T_0, T_2-T_1, \ldots, T_d-T_{d-1})$ representing the spike interval of the output signal output by the reservoir 130. The output node 22 may supply the vector generator section 220 with such inter-spike intervals. The vector generator section 220 may generate the d-dimensional delay coordinate vector by performing the same operation as used for a digital signal on the inter-spike intervals $(T_1-T_0, T_2-T_1, \ldots, T_d-T_{d-1})$. In this way, the reservoir computing system 200 according to the present embodiment can use a spike neural network or the like as the reservoir 130.

The reservoir computing system 200 described above can perform learning, testing, and the like as long as it is possible to acquire an output signal from a portion of the nodes among the plurality of nodes in the reservoir 130. Accordingly, the reservoir 130 does not need to form all of the nodes as physical nodes. In this case, the reservoir 130 may be a device having a fine structure or the like. The reservoir 130 may be a device forming a spin system, a propagation system for surface acoustic waves, a microwave conducting system, or the like. Furthermore, the reservoir 130 may be a device that includes a ferromagnetic material, a phase change material, or the like.

The reservoir 130 may use an input/output response of such a device. Specifically, the reservoir 130 may be a physical reservoir that outputs an electrical, magnetic, optical, mechanical, thermal, or acoustic output signal in response to an electrical, magnetic, optical, mechanical, thermal, or acoustic input signal. The physical reservoir may include a metal layer, a ferroelectric layer, a ferromagnetic layer, a phase change material layer, and/or the like formed on a substrate.

The physical reservoir may receive an input signal from one or more input sections and propagate the input signal therein. By propagating the input signal therein in a plurality of directions, the physical reservoir may change the signal components in a complex manner and operate as a plurality of virtual nodes. The physical reservoir may output an output signal from an output section according to the input signal being propagated in one or more output sections or according to the effect of the input signal. Even if the reservoir computing system 200 is such a physical reservoir, there is no need to exchange signals with virtual nodes, and therefore the physical reservoir can be used as the reservoir 130 by using signal input sections and output sections along with the signals.

Here, if output signals are received from m output sections of the reservoir 130, for example, m output nodes 22 may respectively receive corresponding output signals. The vector generator section 220 may generate $d_1, d_2, \ldots, d_m$-dimensional delay coordinate vectors for each of the m output signals $x_1(t), x_2(t), \ldots, x_m(t)$, for example, as shown in the following expression. As shown in Expression 5, the reservoir computing system 200 may generate $d_1+d_2+\ldots+d_m$-dimensional delay coordinate vectors.

Expression 5:

$$x_1(t) \to \{x_1(t), x_1(t-T), \ldots, x_1(t-(d_1-1)T)\}$$
$$x_2(t) \to \{x_2(t), x_2(t-T), \ldots, x_2(t-(d_2-1)T)\}$$
$$\vdots$$
$$x_m(t) \to \{x_m(t), x_m(t-T), \ldots, x_m(t-(d_m-1)T)\} \to$$
$$(x_1(t), \ldots, x_1(t-(d_1-1)T), x_2(t), \ldots, x_2(t-(d_2-1)T),$$
$$\ldots, \ldots, x_m(t), \ldots, x_m(t-(d_m-1)T))$$

Figure 7:
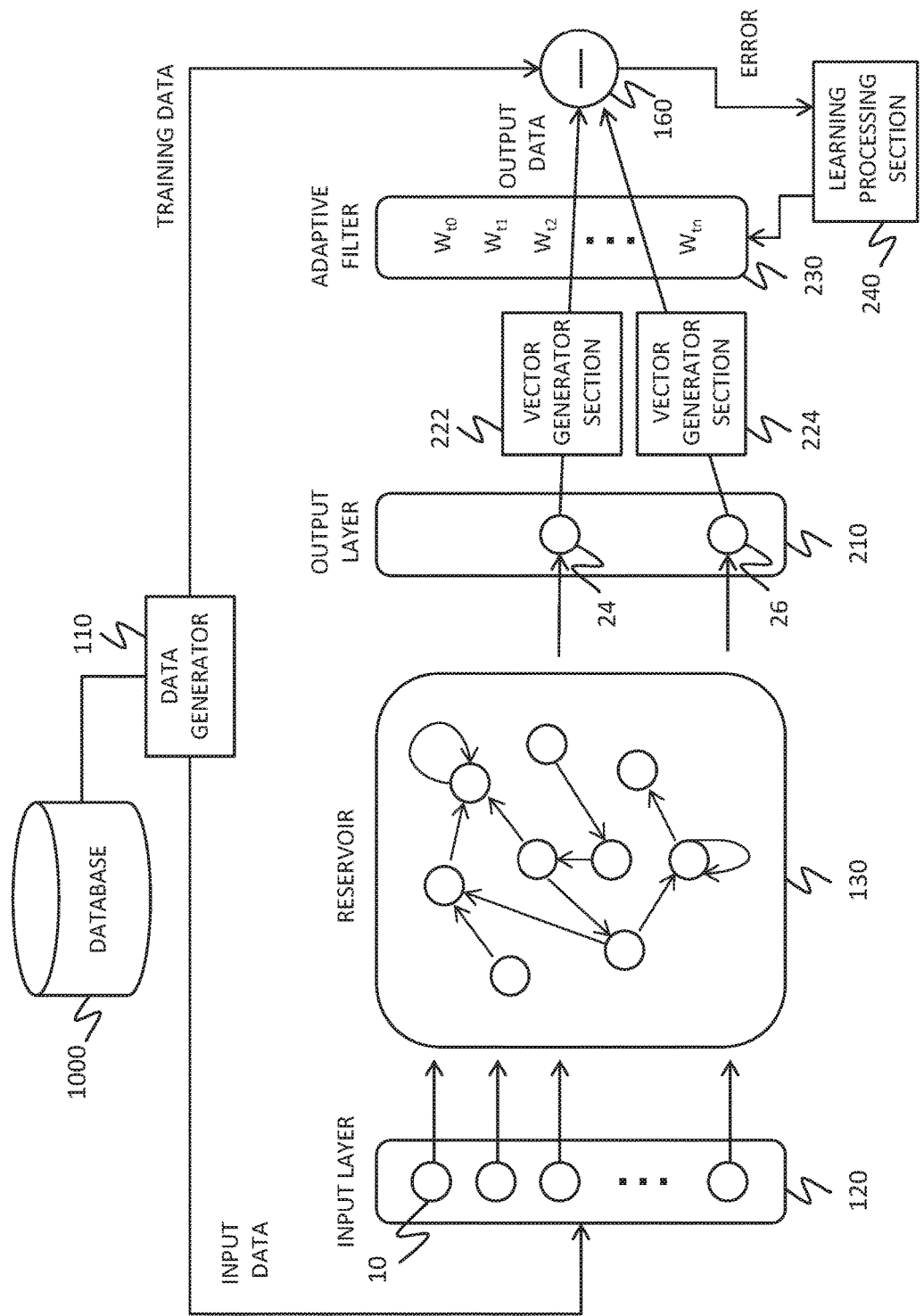
FIG. 7 shows a modification of the reservoir computing system 200 according to the present embodiment.

The reservoir computing system 200 according to the present example described above may include a plurality of output nodes, in order to account for connection failure of the output nodes. Such a reservoir computing system 200 is described using FIG. 7. FIG. 7 shows a modification of the reservoir computing system 200 according to the present embodiment. In the reservoir computing system 200 according to the present modification, components having substantially the same operation as components of the reservoir computing system 200 shown in FIG. 2 are given the same reference numerals and descriptions thereof are omitted.

The reservoir computing system 200 according to the present modification further includes a first output node 24, a second output node 26, a first vector generator section 222, and a second vector generator section 224. The first output node 24 may be connected to a first node among the plurality of nodes of the reservoir 130. The second output node 26 may be connected to a second node among the plurality of nodes of the reservoir 130.

The first vector generator section 222 may be operable to generate the delay coordinate vector, according to the output value from the first output node 24. The second vector generator section 224 may be operable to generate the delay coordinate vector according to the output value from the second output node 26. The adaptive filter 230 may be operable to weight the delay coordinate vector received from the first vector generator section 222 or the second vector generator section 224, and output the result as the output data. In this case, the learning processing section 240 may update different weights for each path as the learning results.

Here, the adaptive filter 230 may be operable to output the output data based on a plurality of output values received by the second output node 26, in response to the path leading to the adaptive filter 230 from the reservoir 130 via the first output node 24 failing. In other words, the reservoir computing system 200 of the present includes a plurality of paths that are each capable of learning independently, and may be operable to perform the learning, testing, or the like using paths that are undamaged among the plurality of paths. In this way, if the reservoir computing system 200 is actually implemented as a hardware device, the reservoir computing system 200 can operate by using other paths when a wiring failure or the like occurs in one of the paths, and can improve the lifespan of the system.

Furthermore, if a plurality of paths are included, the reservoir computing system 200 may be operable to perform the learning, testing, and the like using the plurality of paths. In this case, the output layer 210 may include two or more output nodes connected respectively to two or more nodes among the plurality of nodes of the reservoir 130.

Furthermore, the reservoir computing system 200 may include a plurality of vector generator sections corresponding to the plurality of output nodes. Instead, the reservoir computing system 200 may include one vector generator section, and this one vector generator section may generate a plurality of delay coordinate vectors corresponding respectively to the plurality of output nodes. One or more vector generator sections may generate $d_1, d_2, \ldots, d_m$-dimensional delay coordinate vectors as shown by Expression 5.

The adaptive filter 230 may be operable to output the output data based on results obtained by weighting the plurality of output values output from two or more output nodes at a plurality of timings using a plurality of weights. In this way, by using a plurality of output nodes, it is possible to reduce the number of pieces of time-series data acquired from one output node and to enhance the learning performance. Furthermore, if a failure occurs in one path while performing the learning and testing using a plurality of paths from a plurality of output nodes, the reservoir computing system 200 may continue the learning and testing by using paths excluding this one path.

In the manner described above, the reservoir computing system 100 and the reservoir computing system 200 according to the present embodiment may be operable to realize a physical system having nonlinear dynamics as the reservoir 130. For example, a semiconductor laser has a nonlinear oscillation characteristic or has a nonlinear characteristic that is further strengthened according to outside disturbances or the like, and can therefore be used as the reservoir 130. The following describes an example of a reservoir 130 using a semiconductor laser.

Figure 8:
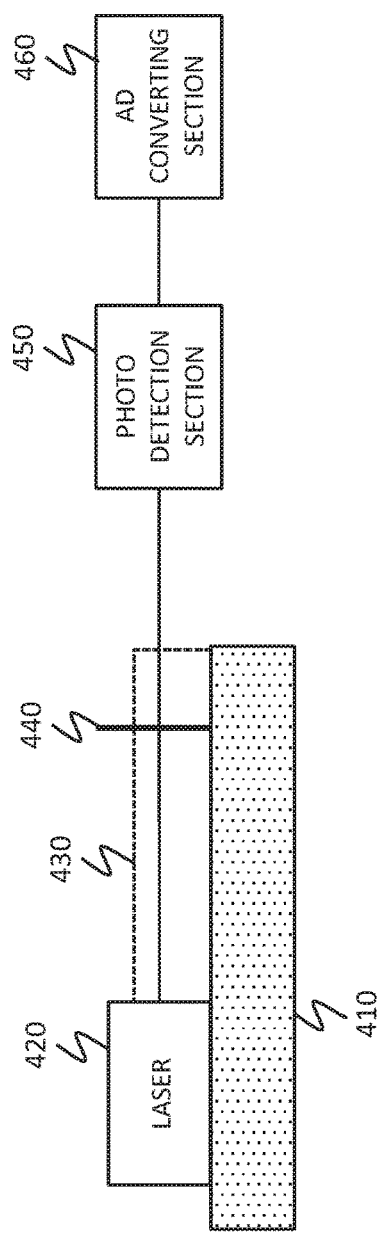
FIG. 8 shows a first exemplary configuration of the reservoir 130 according to the present embodiment.

FIG. 8 shows a first exemplary configuration of the reservoir 130 according to the present embodiment. FIG. 8 shows an example in which the reservoir 130 is a semiconductor laser formed on a substrate. The reservoir 130 includes a substrate 410, a semiconductor laser 420, a waveguide 430, a mirror 440, a photodetection section 450, and an AD converting section 460.

The substrate 410 may be a semiconductor substrate. The substrate 410 is preferably a substrate operable to form a semiconductor laser. For example, the substrate 410 is a silicon substrate. The substrate 410 may be a compound substrate. The semiconductor laser 420 may be operable to output laser light in response to having current injected thereto. The semiconductor laser 420 may be operable to be formed on the substrate 410. The semiconductor laser 420 is a DFB (Distribution Feedback) laser, for example.

The waveguide 430 is formed on the substrate 410, and may be operable to propagate laser light that is output by the semiconductor laser 420 to the photodetection section 450. The waveguide 430 may be a silicon waveguide formed in a silicon substrate. The mirror 440 is provided in the waveguide 430 and may be operable to reflect a positon of the laser light output by the semiconductor laser 420. The mirror 440 may be operable to function as a half-mirror that reflects a portion of the laser light toward this semiconductor laser 420 and transparently passes the remaining portion in a manner to propagate to the photodetection section 450. The mirror 440 may be a Bragg reflective mirror formed in a silicon waveguide. In this case, the mirror 440 may be operable to have the reflectivity thereof adjusted by having current injected thereto.

The photodetection section 450 may be operable to receive the laser light output from the waveguide 430. The photodetection section 450 may be operable to output an electrical signal corresponding to the intensity of the received laser light. The photodetection section 450 may be operable to output an electrical signal corresponding to fluctuation over time of the laser light output. The photodetection section 450 may be a photodiode or the like.

The AD converting section 460 may be operable to convert the electrical signal output by the photodetection section 450 into a digital signal. The AD converting section 460 may convert the electrical signal input thereto into a digital signal at substantially constant predetermined time intervals, according to a clock signal or the like. The AD converting section 460 may include an AD converter of a type such as sequential comparison, flash, pipeline, or digital. For example, the AD converting section 460 may include circuit elements of a MOS structure formed on a silicon substrate or the like.

The semiconductor laser 420 and the waveguide 430 described above may be formed integrally on the substrate 410. Furthermore, the semiconductor laser 420, the waveguide 430, and the mirror 440 are preferably formed integrally on the substrate 410. For example, the semiconductor laser 420, the waveguide 430, and the mirror 440 are formed by applying machining such as etching, deposition, or the like to a silicon substrate. The photodetection section 450 may also be formed integrally on the substrate 410. Furthermore, the AD converting section 460 may also be formed integrally on the substrate 410.

The reservoir 130 of the first exemplary configuration described above may output a response that is nonlinear with respect to the time axis, using the semiconductor laser 420 that has a feedback function due to the mirror 440. Specifically, the semiconductor laser 420 may be operable to perform laser oscillation according to a current injected thereto, while receiving external disturbances due to feedback light caused by the mirror 440. Due to such external feedback, the semiconductor laser 420 preferably causes the intensity of the output light to have a time waveform that vibrates self-excitedly, even when the position and reflectivity of the mirror 440 are substantially constant.

Furthermore, the reservoir 130 according to the first exemplary configuration may be operable to output a more complex time response by modulating the position and/or reflectivity of the mirror 440. For example, if a plate-shaped mirror 440 is provided, the reservoir 130 may perform modulation by moving the position of this mirror 440 with an actuator or the like. Furthermore, if a Bragg reflection mirror is provided as the mirror 440, the reservoir 130 may modulate the current injected into the Bragg reflection mirror. Alternatively, the reservoir 130 may modulate the current injected into the semiconductor laser 420.

In this way, the reservoir 130 of the first exemplary configuration can modulate the light output of the laser light input to the photodetection section 450 in a temporally complex manner, and can therefore be adopted in a reservoir computing system 100. For example, the reservoir 130 supplies each of the output nodes 20 corresponding to the output layer 140 shown in FIG. 1 with time-series digital signals $S_1$ to $S_n$ output by the photodetection section 450 at timings from $t_1$ to $t_n$. In this way, the reservoir 130 of the first exemplary configuration can operate as the reservoir 130 of the reservoir computing system 100 shown in FIG. 1.

Furthermore, as an example, the reservoir 130 of the first exemplary configuration supplies the output node 22 of the output layer 210 shown in FIG. 2 with a time-series digital signal sequence $(S_1, S_2, \ldots, S_n)$ output by the photodetection section 450 at the timings from $t_1$ to $t_n$. In this way, the reservoir 130 of the first exemplary configuration can operate as the reservoir 130 of the reservoir computing system 200 shown in FIG. 2.

The reservoir 130 of the first exemplary configuration described above can lengthen the delay time for inputting the external feedback light as the distance D between the semiconductor laser 420 and the mirror 440 becomes longer, and can therefore be output a more complex time response. However, if the semiconductor laser 420 and the mirror 440 are formed integrally on the substrate 410 that is made of silicon or the like, for example, it is difficult to perform manufacturing stably by separating the semiconductor laser 420 and the mirror 440 by a distance D of approximately several centimeters. In other words, it is possible to achieve miniaturization by forming these components integrally in the reservoir 130, but the distance D is more than 1 cm and it is difficult to make the delay time greater than or equal to approximately 10 ps.

Furthermore, the semiconductor laser 420 and the mirror 440 can be formed independently and further separated by a distance D, but the reservoir 130 increases in size by this separation distance. Furthermore, if the semiconductor laser 420 and the mirror 440 are formed independently, a precise adjustment of the optical axis is necessary, and this increases the manufacturing cost. The following describes a reservoir 130 that enables lengthening of the distance D without performing a precise adjustment of the optical axis.

Figure 9:
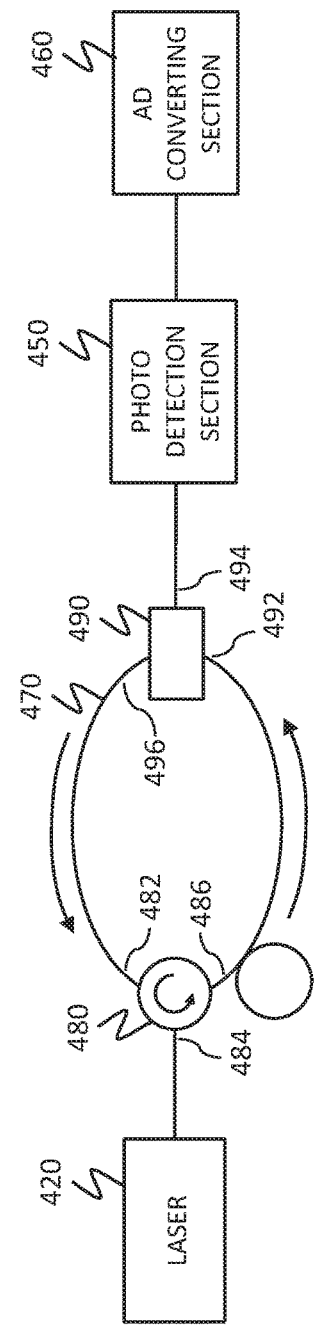
FIG. 9 shows a second exemplary configuration of the reservoir 130 according to the present embodiment.

FIG. 9 shows a second exemplary configuration of the reservoir 130 according to the present embodiment. FIG. 9 shows an example in which the reservoir 130 is a laser apparatus using optical fiber. In the reservoir 130 of the second exemplary configuration, components having substantially the same operation as components of the reservoir 130 of the first exemplary configuration shown in FIG. 8 are given the same reference numerals, and descriptions thereof are omitted. The reservoir 130 includes a semiconductor laser 420, a photodetection section 450, an AD converting section 460, optical fiber 470, an optical circulator 480, and an optical coupler 490.

The semiconductor laser 420 of the second exemplary configuration may be operable to output laser light to the optical fiber 470. The semiconductor laser 420 may be a device with a fiber pigtail attached thereto. The optical fiber 470 is provided between each device and may be operable to propagate the laser light. For example, the optical fiber 470 is provided between the semiconductor laser 420 and the optical circulator 480. Furthermore, the optical fiber 470 is provided between the optical circulator 480 and the optical coupler 490.

The optical circulator 480 may be a three-port type of optical circulator that includes a first port 482, a second port 484, and a third port 486. As an example, the optical circulator 480 outputs the light input to the first port 482 from the second port 484 and outputs the light input to the second port 484 from the third port 486. FIG. 9 shows an example in which the second port 484 of the optical circulator 480 is connected to the semiconductor laser 420, the light input to the first port 482 is supplied to the semiconductor laser 420, and the laser light output from the semiconductor laser 420 is output from the third port 486.

The optical coupler 490 may be a one-input two-output optical coupler that includes a first input 492, a second output 494, and a third output 496. The optical coupler 490 may cause the light input thereto to be split or combined. FIG. 9 shows an example in which the light input from the first input 492 by the optical coupler 490 is split to the second output 494 and the third output 496. The optical coupler 490 may output the laser light from the second output 494 to the photodetection section 450. Furthermore, the reservoir 130 may supply the semiconductor laser 420 with the laser light output from the third output 496 of the optical coupler 490 as the external feedback light.

The reservoir 130 of the second exemplary configuration described above may have the optical coupler 490 output a portion of the laser light output from the semiconductor laser 420 to the outside and feed the remaining portion of the laser light back to the semiconductor laser 420. The reservoir 130 of the second exemplary configuration may have the optical fiber 470 provided between the semiconductor laser 420 and the optical circulator 480 and between the optical circulator 480 and the optical coupler 490. Specifically, the delay time for inputting the external feedback light to the semiconductor laser 420 can be easily adjusted according to the length of the optical fiber 470.

For example, it is possible to set the length of the optical fiber 470 to be from approximately 10 cm to approximately several kilometers. In this way, the reservoir 130 of the second exemplary configuration can realize a longer delay time at a lower cost compared to the reservoir 130 of the first exemplary configuration. Due to such external feedback light, the reservoir 130 can output a response that is non-linear with respect to the time axis. Specifically, the semiconductor laser 420 can cause the intensity of the output light to have a time waveform that vibrates self-excitedly due to the external feedback light, even when the splitting ratio of the optical coupler 490 is substantially constant.

In this way, the reservoir 130 having the second exemplary configuration can cause the optical output of the laser light input to the photodetection section 450 to fluctuate in a complicated manner over time, and therefore it is possible to use this reservoir 130 in the reservoir computing system 100, in the same manner as the reservoir 130 having the first exemplary configuration. However, the reservoir 130 having the second exemplary configuration uses a longer optical fiber to realize a long delay time, and therefore is larger than the reservoir 130 having the first exemplary configuration. Therefore, in the present embodiment, a description is provided for a reservoir that can adjust the delay time, has a reduced cost, and does not have an increased size.

Figure 10:
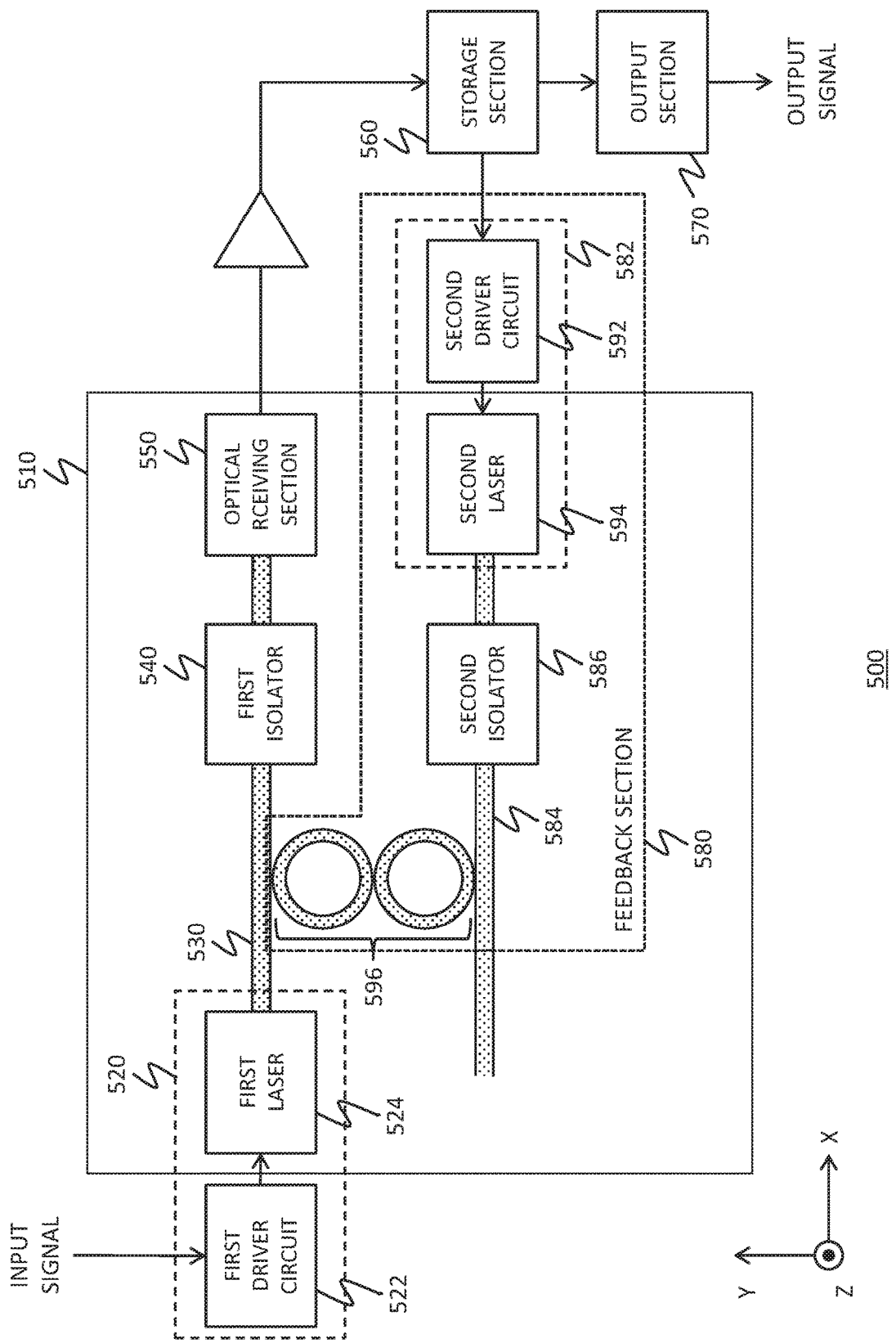
FIG. 10 shows an exemplary configuration of the reservoir 500 according to the present embodiment.

FIG. 10 shows an exemplary configuration of the reservoir 500 according to the present embodiment. The reservoir 500 is operable to adjust the delay time of the feedback light that is fed back to the laser oscillation source, by converting the optical signal into an electrical signal and handling this electrical signal as data. The reservoir 500 may be a reservoir for an optical reservoir computing system. The reservoir 500 includes a substrate 510, a first optical output section 520, a first optical waveguide 530, a first isolator 540, an optical receiving section 550, a storage section 560, an output section 570, and a feedback section 580.

The substrate 510 may be a semiconductor substrate. The substrate 510 is preferably a substrate on which it is possible to form a semiconductor laser and the like. The substrate 510 may be a silicon-based substrate. The substrate 510 may be any one of a silicon substrate, a compound semiconductor substrate, a glass substrate, a ceramic substrate, and the like. FIG. 10 shows an exemplary configuration in the XY plane, which is substantially parallel to the front surface of the substrate 510. The substrate 510 may have optical elements and the like formed thereon by having machining such as deposition, burying, and etching performed thereon in a Z direction that is substantially perpendicular to the front surface.

The first optical output section 520 may output a first optical signal. The first optical output section 520 may output the first optical signal corresponding to a first optical control signal. Here, the first optical control signal may be a signal based on the input signal supplied to this reservoir 500. The first optical output section 520 includes a first driver circuit 522 and a first laser 524, for example.

The first driver circuit 522 may drive the first laser 524. The first driver circuit 522 may supply the first laser 524 with the first optical control signal, according to the input signal supplied from the outside. The first driver circuit 522 supplies a drive current corresponding to the voltage value of the input signal to the first laser 524 as the first optical control signal, for example.

The first laser 524 may be operable to output laser light according to the drive current supplied thereto. The first laser 524 may be a semiconductor laser that can be formed on the substrate 510. The first laser 524 is a DFB (Distribution Feedback) laser, for example. In this case, the first laser 524 can be formed with a length from substantially 100 μm to substantially 1 mm in a first direction on the substrate 510. The first laser 524 is preferably formed with a length of approximately several hundred micrometers in the first direction. Furthermore, the first laser 524 can be formed with a length from substantially 10 μm to several hundred micrometers, in a second direction that is orthogonal to the first direction on the substrate 510. The first laser 524 is preferably formed with a length of approximately tens of micrometers in the second direction. In the example of FIG. 10, the first direction is the X direction and the second direction is the Y direction.

The first optical waveguide 530 may propagate the first optical signal output by the first optical output section 520. The first optical waveguide 530 may propagate the first optical signal to the optical receiving section 550. The first optical waveguide 530 preferably propagates the first optical signal to the optical receiving section 550 via the first isolator 540.

The first isolator 540 may pass the light heading toward the optical receiving section 550 from the first optical waveguide 530, and block the light heading to the first optical waveguide 530 from the optical receiving section 550. The first isolator 540 attenuates the light and the like reflected to the first laser 524, and prevents abnormal oscillation or the like of the first laser 524.

The first isolator 540 may include two optical couplers, a phase shifter, and a magnetic field applying section, for example. In this case, the first isolator 540 may use the first optical coupler to split the optical signal to be input in two directions, which are a waveguide including the phase shifter and a waveguide that does not include the phase shifter. The first isolator 540 applies magnetic fields with different directions to the split optical signals passing respectively through the two waveguides, and may then combine the waves using the second optical coupler. The first isolator 540 can pass the optical signal oriented in the forward direction and block the optical signal oriented in the backward direction, by having the phase shifter apply a phase shift corresponding to polarized light of substantially 90° to the optical signal passing therethrough.

The optical receiving section 550 may receive the first optical signal from the first optical waveguide 530. The optical receiving section 550 may output an electrical signal corresponding to the optical intensity of the received first optical signal. The optical receiving section 550 outputs the electrical signal corresponding to the fluctuation over time of the optical output of the first optical signal, for example. The optical receiving section 550 may supply the storage section 560 with the electrical signal, obtained by converting the first optical signal into an electrical signal, as the received optical data. The optical receiving section 550 may include a photodiode or the like.

The storage section 560 stores the received optical data that corresponds to the first optical signal and is output by the optical receiving section 550. The storage section 560 may include a memory operable to store data. Furthermore, the storage section 560 may include processing circuits such as an FPGA and a CPU that are operable to compute the data. A limiting amp or the like may be provided between the optical receiving section 550 and the storage section 560.

The output section 570 may output an output signal based on the received optical data stored in the storage section 560. Specifically, the output section 570 may output the output signal based on the received optical data as the output signal of the reservoir.

The feedback section 580 may apply feedback corresponding to the received optical data stored in the storage section 560 to the first optical signal. The feedback section 580 may delay the optical signal based on the first optical signal at one timing by a predetermined time, in order to make the output signal of the reservoir nonlinear, and then apply the feedback to the first optical signal at a timing later than the one timing. FIG. 10 describes an example in which the feedback section 580 directly applies the feedback light to the terminal of the first laser 524 outputting the first optical signal. The feedback section 580 includes a second optical output section 582, a second optical waveguide 584, and a second isolator 586.

The second optical output section 582 may output a second optical signal corresponding to the received optical data stored in the storage section 560. Specifically, the second optical output section 582 may output a second optical signal corresponding to the first optical signal. The second optical output section 582 includes a second driver circuit 592 and a second laser 594, for example.

The second driver circuit 592 may drive the second laser 594. The second driver circuit 592 may supply the second laser 594 with a drive current for driving the second laser 594, according to the received optical data stored in the storage section 560. The second driver circuit 592 supplies the second laser 594 with a drive current corresponding to the voltage value of the received optical data, for example.

The second laser 594 may be operable to output laser light according to the drive current supplied thereto. The second laser 594 may be a semiconductor laser that can be formed on the substrate 510. The second laser 594 is a DFB (Distribution Feedback) laser, for example. In this case, the second laser 594 may be the same type of laser as the first laser 524.

The second optical waveguide 584 propagates the second optical signal output by the second optical output section 582 toward the first optical output section 520. The second optical waveguide 584 may include the optical coupler 596, and propagate the second optical signal to the first optical output section 520. An end of the second optical waveguide 584 on the side opposite the second optical output section 582 may be terminated by a light absorbing element or the like, in order to prevent reflected light from being generated.

The optical coupler 596 may optically couple the second optical waveguide 584 with the first optical waveguide 530. Specifically, the optical coupler 596 may cause the second optical signal from the second optical waveguide 584 to be incident to the first optical output section 520, via at least a portion of the first optical waveguide 530. FIG. 10 shows an example in which the optical coupler 596 is a ring coupler. Instead, the optical coupler 596 may be a waveguide type of optical coupler.

Above, an example is described in which the first optical waveguide 530 and the second optical waveguide 584 are optically coupled by the optical coupler 596, but the present invention is not limited to this. The first optical waveguide 530 and the second optical waveguide 584 may be coupled in a manner to form an optical circulator. Specifically, at least a portion of the first optical signal may be propagated to the optical receiving section 550 and at least a portion of the second optical signal may be propagated to the first laser 524. Furthermore, the first optical signal is preferably barely propagated to the second laser 594 and the second optical signal is preferably barely propagated to the optical receiving section 550.

The second optical waveguide 584 preferably propagates the second optical signal via the second isolator 586. The second isolator 586 may pass the light headed toward the second optical waveguide 584 from the second optical output section 582 and block the light headed toward the second optical output section 582 from the second optical waveguide 584. The second isolator 586 may be the same type of optical device as the first isolator 540.

As described above, the reservoir 500 in the present embodiment is operable to convert the first optical signal from the first optical output section 520 into an electrical signal, store this electrical signal in the storage section 560, convert the stored electrical signal into the second optical signal, and generate the feedback light. Specifically, the feedback section 580 can read the received optical data stored in the storage section 560 after the predetermined delay time has passed, and apply the feedback corresponding to the read received optical data to the first optical signal.

Accordingly, the reservoir 500 can easily control the delay time by adjusting the reading time, without using optical fiber or the like with a length reaching several kilometers in order to create the delay. Specifically, the reservoir 500 can supply the first optical signal with the second optical signal whose delay time has been freely adjusted to exceed 1 ns as the feedback light, for example, without significantly changing the configurations of the optical devices and the electrical devices.

Furthermore, the optical devices and the electrical devices can be formed on a silicon substrate, and therefore integration is easy. Specifically, such a reservoir 500 can operate as the reservoir of an optical reservoir computing system while realizing miniaturization and low cost.

The feedback section 580 preferably reproduces an optical signal whose time waveform is similar to the time waveform of the first optical signal, and feeds this signal back as the second optical signal. The feedback section 580 may adjust the intensity of the second optical signal to realize suitable feedback, and then feed this signal back to the first optical signal.

Here, the feedback section 580 may be operable to perform adjustment to make the nonlinearity of the reservoir 500 more complicated. For example, the feedback section 580 adjusts the reading time for the received optical data to change the delay time. In this case, the feedback section 580 may be operable to, in response to receiving a first change instruction designating a change of the delay time, change the delay time to be a time designated by this first change instruction. In this way, the reservoir 500 can adjust the nonlinearity of the output light over time.

Furthermore, the feedback section 580 may apply, to the first optical signal, feedback corresponding to data obtained by performing at least one computation, including amplification, attenuation, integration, smoothing, and reordering, on the received optical data output by the optical receiving section 550. The feedback section 580 uses the second optical signal with a time waveform differing from the time waveform of the first optical signal as feedback based on the first optical signal, and can therefore make the nonlinearity of the reservoir 500 more complicated.

In this case as well, the feedback section 580 may be operable to adjust the nonlinearity of the reservoir 500 over time. The feedback section 580 may, in response to receiving a second change instruction designating a change in the computation method, change the computation to be the computation designated by this second change instruction, for example. In this way, the reservoir 500 can adjust the nonlinearity of the output light over time.

The reservoir 500 according to the present embodiment is described as an example in which the feedback section 580 supplies the feedback light to the output terminal of the first laser 524, but the present invention is not limited to this. The reservoir 500 may apply the feedback to the first optical waveguide 530 that propagates the first optical signal and/or the electrical signal of the first optical output section 520 generating the first optical signal. The following describes such a reservoir 500.

Figure 11:
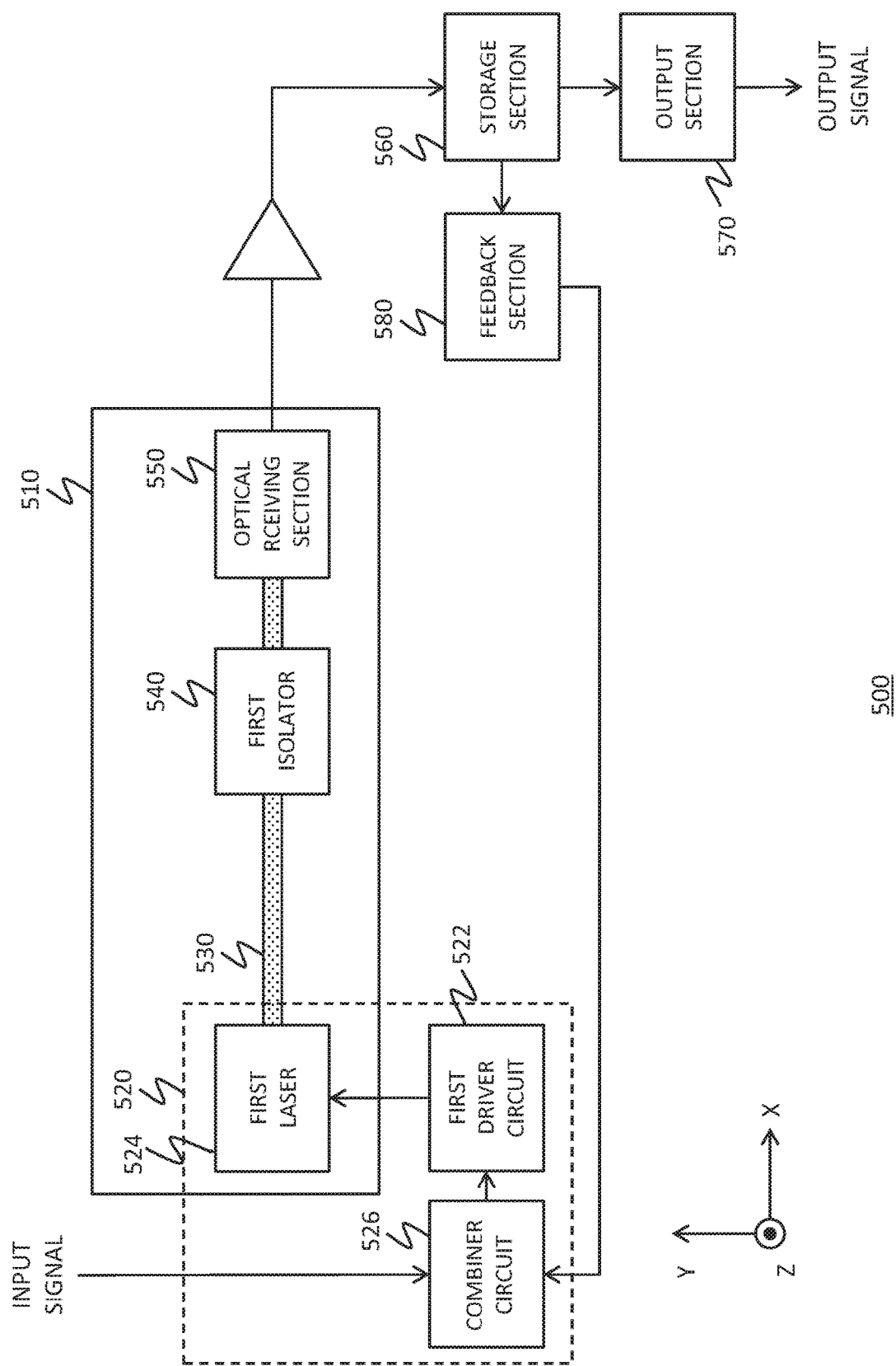
FIG. 11 shows a first modification of the reservoir 500 according to the present embodiment.

FIG. 11 shows a first modification of the reservoir 500 according to the present embodiment. In the reservoir 500 of the first modification, components having substantially the same operation as those of the reservoir 500 according to the embodiment shown in FIG. 10 are given the same reference numerals and redundant descriptions are omitted. The reservoir 500 of the first modification is an example in which the feedback section 580 provides the feedback with an electrical signal to the first optical output section 520.

In this case, the feedback section 580 may supply the first optical output section 520 with the second optical control signal corresponding to the received optical data stored in the storage section 560. Specifically, the feedback section 580 does not need to include the second optical output section 582, the second optical waveguide 584, and the second isolator 586.

The first optical output section 520 may output the first optical signal corresponding to the first optical control signal and the second optical control signal. In this case, the first optical output section 520 may further include a combiner circuit 526. The combiner circuit 526 combines the second optical control signal with the first optical control signal input to this reservoir 500, to generate the control signal to which feedback is applied. In this way, the first optical output section 520 can drive the first laser 524 with a drive current having the feedback added thereto, to output the first optical signal with nonlinearity.

Figure 12:
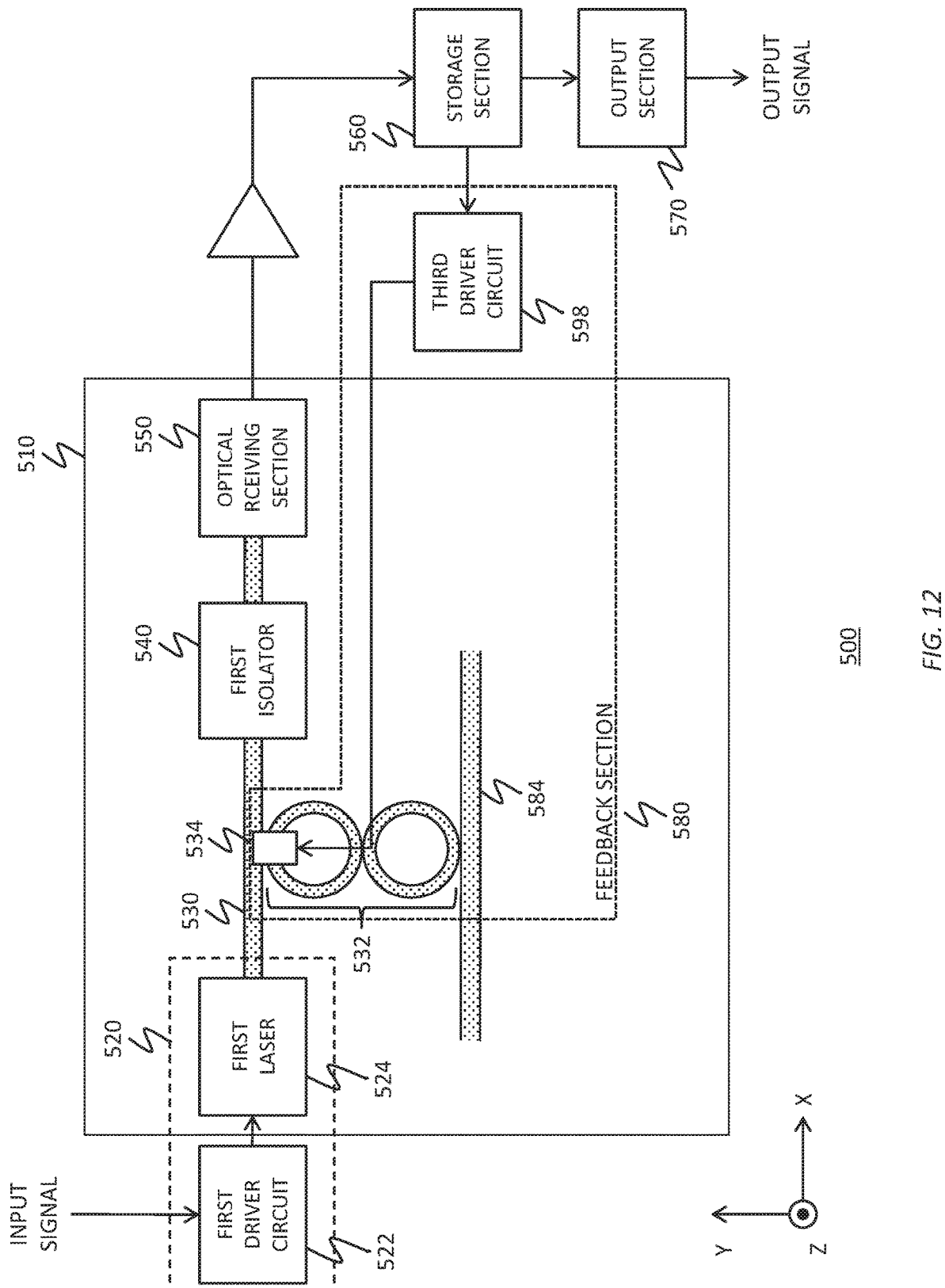
FIG. 12 shows a second modification of the reservoir 500 according to the present embodiment.

FIG. 12 shows a second modification of the reservoir 500 according to the present embodiment. In the reservoir 500 of the second modification, components having substantially the same operation as those of the reservoir 500 according to the embodiment shown in FIG. 10 are given the same reference numerals and redundant descriptions are omitted. The reservoir 500 of the second modification is an example in which the feedback section 580 provides the feedback to the first optical waveguide 530.

In this case, the feedback section 580 may modulate the first optical signal propagating through the first optical waveguide 530 according to the received optical data stored in the storage section 560. Specifically, the feedback section 580 does not need to include the second optical output section 582, the second optical waveguide 584, and the second isolator 586.

In this case, the feedback section 580 may further include an optical modulating section 532 and a third driver circuit 598. The optical modulating section 532 includes an optical coupler that optically couples with the first optical waveguide 530, and a temperature adjusting section 534 that changes the optical coupling ratio of this optical coupler. Specifically, the optical modulating section 532 changes the optical coupling ratio of the optical coupler by changing the temperature of the optical coupler according to an input signal. Accordingly, the first optical signal passing through the first optical waveguide 530 is modulated according to a modulation control signal input to the optical modulating section 532.

The third driver circuit 598 may supply the temperature adjusting section 534 of this optical modulating section 532 with the modulation control signal corresponding to the received optical data. In this way, the feedback section 580 can apply the feedback to the first optical signal passing through the first optical waveguide 530, and output the first optical signal with nonlinearity. The above describes an example in which the optical modulating section 532 includes the optical coupler, but the present invention is not limited to this. The optical modulating section 532 may be any element that can modulate an optical signal according to an electrical signal. Furthermore, both ends of the second optical waveguide 584 may be terminated with an optical absorption element or the like, in order to prevent the generation of reflected light.

The reservoirs 500 of the first modification and the second modification can apply the feedback using an electrical signal, and can therefore reduce the number of light sources such as lasers. Accordingly, it is possible to realize the reservoir 500 at a lower cost.

The reservoir 500 according to the present embodiment is described as an example in which a corresponding output signal is output from the output section 570 according to an input signal input to the first optical output section 520. However, the input section for inputting the input signal and the acquiring section for acquiring the output signal are not limited to such configurations.

For example, the input signal may be input to the storage section 560. By including an FPGA or the like in the storage section 560, the storage section 560 becomes operable to generate therein the first optical control signal based on the received optical data and the input signal. In this way, the feedback section 580 can apply, to the first optical signal, the feedback corresponding to the input signal for the reservoir 500 and the received optical data stored in the storage section 560.

Furthermore, the output signal may be a signal obtained through a photoelectric conversion by the optical receiving section 550, instead of the storage section 560. Yet further, the output signal may be a signal obtained by acquiring a portion of the optical signal passing through the first optical waveguide 530 and performing a photoelectric conversion on the acquired signal.

Here, if the storage section 560 includes an FPGA or the like, it is possible to perform numerical processing on at least one of the input signal, the output signal, and the received optical data. For example, the storage section 560 may perform a Fourier transform on the input signal. Furthermore, the storage section 560 may perform a filtering process on at least one of the input signal, the output signal, and the received optical data. The learning processing section 170 and the like may be implemented in the FPGA.

The reservoir 500 according to the present embodiment described above is preferably able to output an output signal with suitable nonlinearity according to data to be learned. Specifically, the reservoir 500 may be operable to adjust the delay time, the amplification rate, the attenuation rate, the computation, and the like of the electrical signal, the optical signal, and the like therein, and is preferably further able to determine these parameters through learning.

The learning processing section 170 may be operable to learn these parameters along with learning the rule of transformation from the output signal output by the reservoir 500 to the output data, using input data and output data for learning. In this case, as an example, the feedback section 580 reads the received optical data stored in the storage section 560 after the predetermined delay time has passed, and applies the feedback corresponding to the read received optical data to the first optical signal. The learning processing section 170 may then use the input data and output data for learning to further learn the delay time of the reservoir 500, after having learned the rule of transformation to the output data.

In this case, the feedback section 580 may apply, to the first optical signal, feedback corresponding to data obtained by performing at least one computation, including amplification, attenuation, integration, smoothing, and reordering, on the received optical data output by the optical receiving section 550. The learning processing section 170 may be operable to then further learn the parameters relating to these computations. In this way, it is possible to suitably determine the internal parameters of the reservoir 500, and to increase the learning efficiency of the reservoir computing system 100.

Figure 13:
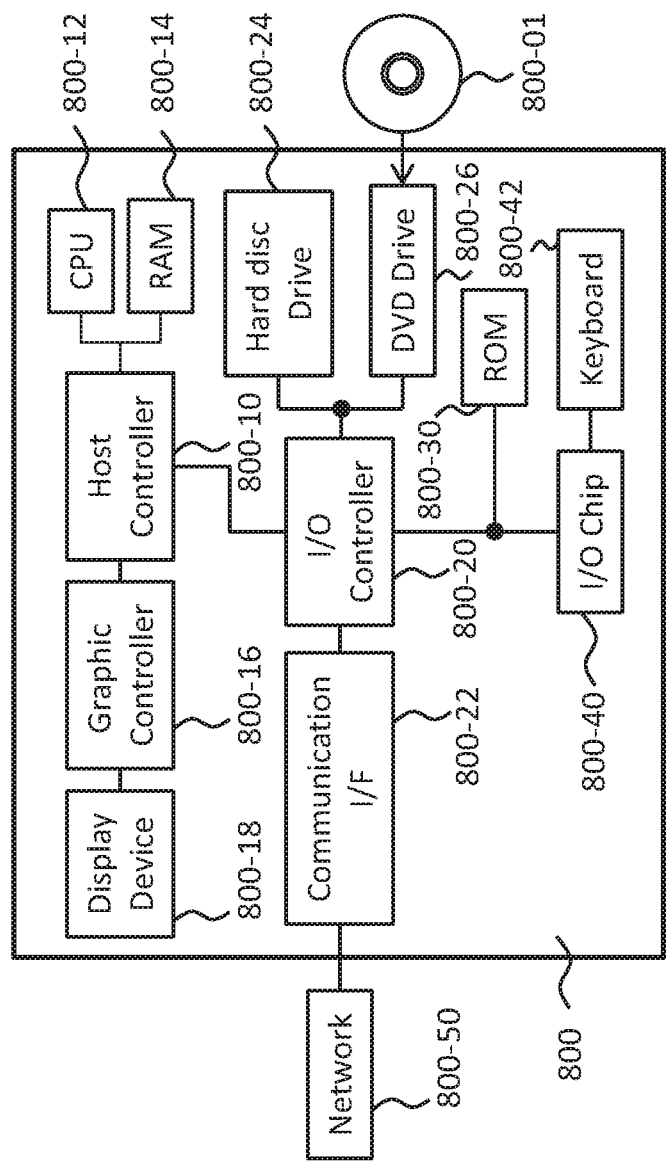
FIG. 13 shows an exemplary hardware configuration of a computer according to the embodiment of the invention.

FIG. 13 shows an exemplary hardware configuration of a computer according to the embodiment of the invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14. In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize nonlinear input/output characteristics in a device that has a small size and low cost, and can be used as a reservoir when a reservoir computing system is implemented as actual hardware.

What is claimed is:

1. A reservoir for an optical reservoir computing system, comprising:
   a first optical output section that outputs a first optical signal;
   a first optical waveguide that propagates the first optical signal output by the first optical output section;
   an optical receiving section that receives the first optical signal from the first optical waveguide;
   an optical coupler that optically couples a second optical waveguide to the first optical waveguide, wherein the optical coupler causes the second optical signal from the second optical waveguide to be incident to the first optical output section via at least a portion of the first optical waveguide;
   a storage section that stores received electrical signals obtained by converting the first optical signal into an electrical signal representing optical data corresponding to the first optical signal and output by the optical receiving section; and
   a feedback section that applies, to the first optical signal, feedback corresponding to the received optical data stored in the storage section.

2. The reservoir according to claim 1, wherein the feedback section includes:
   a second optical output section that outputs a second optical signal corresponding received optical data stored in the storage section; and wherein the second optical waveguide propagates the second optical signal output by the second optical output section toward the first optical output section.

3. The reservoir according to claim 1, wherein the optical coupler is a ring coupler.

4. The reservoir according to claim 2, farther comprising:
a first isolator that passes light headed toward the optical receiving section from the first optical waveguide and blocks light headed toward the first optical waveguide from the optical receiving section.

5. The reservoir according to claim 4, further comprising:
a second isolator that passes light headed toward the second optical waveguide from the second optical output section and blocks light headed toward the second optical output section from the second optical waveguide.

6. The reservoir according to claim 1, wherein
the feedback section supplies the first optical output section with a second optical control signal corresponding to the received optical data stored in the storage section, and
the first optical output section outputs the first optical signal corresponding to the second optical control signal.

7. The reservoir according to claim 1, wherein
the feedback section modulates the first optical signal propagating through the first optical waveguide, according to the received optical data stored in the storage section.

8. The reservoir according to claim 1, wherein
the first optical output section outputs the first optical signal corresponding to a first optical control signal based on an input signal input to the reservoir.

9. The reservoir according to claim 1, wherein
the feedback section applies, to the first optical signal, feedback corresponding to an input signal input to the reservoir and the received optical data stored in the storage section.

10. The reservoir according to claim 1, further comprising:
an output section that outputs an output signal of the reservoir, based on the received optical data stored in the storage section.

11. The reservoir according to claim 1, wherein
the feedback section reads the received optical data stored in the storage section after a predetermined delay time has passed, and
the feedback section applies, to the first optical signal, feedback corresponding to the read received optical data.

12. The reservoir according to claim 11, wherein
the feedback section, in response to receiving a first change instruction designating a change of the delay time, changes the delay time to be a time designated by the first change instruction.

13. The reservoir according to claim 1, wherein
the feedback section applies, to the first optical signal, feedback corresponding to data obtained by performing at least one computation, including amplification, attenuation, integration, smoothing, and reordering, on the received optical data output by the optical receiving section.

14. The reservoir according to claim 13, wherein
the feedback section, in response to receiving a second change instruction designating a change of a computation method, changes the computation to be a computation designated by the second change instruction.

15. A reservoir computing system comprising:
a reservoir for the reservoir computing system, comprising:
a first optical output section that outputs a first optical signal;
a first optical waveguide that propagates the first optical signal output by the first optical output section;
an optical receiving section that receives the first optical signal from the first optical waveguide;
an optical coupler that optically couples a second optical waveguide to the first optical waveguide, wherein the optical coupler causes the second optical signal from the second optical waveguide to be incident to the first optical output section via at least a portion of the first optical waveguide;
a storage section that stores received electrical signals obtained by converting the first optical signal into an electrical signal representing optical data corresponding to the first optical signal and output by the optical receiving section; and
a feedback section that applies, to the first optical signal, feedback corresponding to the received optical data stored in the storage section;
an input node that supplies an input signal corresponding to input data to the reservoir; and
an output node that outputs output data corresponding to an output signal output by the reservoir in response to the input data.

16. The reservoir computing system according to claim 15, further comprising:
a learning processing section that learns a rule of transformation from the output signal output by the reservoir to the output data, using input data and output data for learning.

17. The reservoir computing system according to claim 16, wherein
the feedback section of the reservoir reads the received optical data stored in the storage section after a predetermined delay time has passed,
the feedback section of the reservoir applies, to the first optical signal, feedback corresponding to the read received optical data, and
the learning processing section of the reservoir further learns the delay time.

18. The reservoir computing system according to claim 17, wherein
the feedback section of the reservoir applies, to the first optical signal, feedback corresponding to data obtained by performing at least one computation, including amplification, attenuation, integration, smoothing, and reordering, on the received optical data output by the optical receiving section, and
the learning processing section further learns a parameter relating to the computation.

19. A reservoir for an optical reservoir computing system, comprising:
a first optical output section that outputs a first optical signal;
a first optical waveguide that propagates the first optical signal output by the first optical output section;
an optical receiving section that receives the first optical signal from the first optical waveguide;
an optical coupler that optically couples a second optical waveguide to the first optical waveguide, wherein the optical coupler causes the second optical signal from the second optical waveguide to be incident to the first optical output section via at least a portion of the first optical waveguide;
a first isolator that passes light headed toward the optical receiving section from the first optical waveguide and blocks light headed toward the first optical waveguide from the optical receiving section;
a storage section that stores received optical data corresponding to the first optical signal and output by the optical receiving section; and
a feedback section that applies, to the first optical signal, feedback corresponding to the received optical data stored in the storage section.

* * * * *